United States Patent [19]
Yagoto

[11] Patent Number: 5,398,096
[45] Date of Patent: Mar. 14, 1995

[54] AUTOMATED FOCUS POINT CONTROL DEVICE

[75] Inventor: Mitsutoshi Yagoto, Toyokawa, Japan

[73] Assignee: Minolta Co., Ltd., Osaka, Japan

[21] Appl. No.: 71,750

[22] Filed: Jun. 9, 1993

[30] Foreign Application Priority Data

Jun. 15, 1992 [JP] Japan .................. 4-180420
Oct. 6, 1992 [JP] Japan .................. 4-266429

[51] Int. Cl.⁶ .............................. G03B 3/00
[52] U.S. Cl. ............................ 355/55; 355/45; 354/400
[58] Field of Search ............ 355/45, 55; 354/400, 354/402, 404

[56] References Cited

U.S. PATENT DOCUMENTS 4,902,101 2/1990 Fujihara ............ 354/400 X
4,988,187 1/1991 Kuriyama ........... 355/55 X

FOREIGN PATENT DOCUMENTS 62-238510 10/1987 Japan .
62-283323 12/1987 Japan .

Primary Examiner—Michael L. Gellner
Assistant Examiner—Daniel P. Malley
Attorney, Agent, or Firm—Price, Gess & Ubell

[57] ABSTRACT

An automated focus point control device wherein the focus point is aligned by adjusting a projection optical unit based on signals outputted from a sensor which detects the light transmitted through a boundary portion of a margin portion and a frame portion of a film.

An automated focus point control device wherein the focus position is determined by detecting a projected image contrast on a priority basis at three points including the center position and lateral positions at both sides of the center position within the adjusting range of a projecting system.

9 Claims, 24 Drawing Sheets

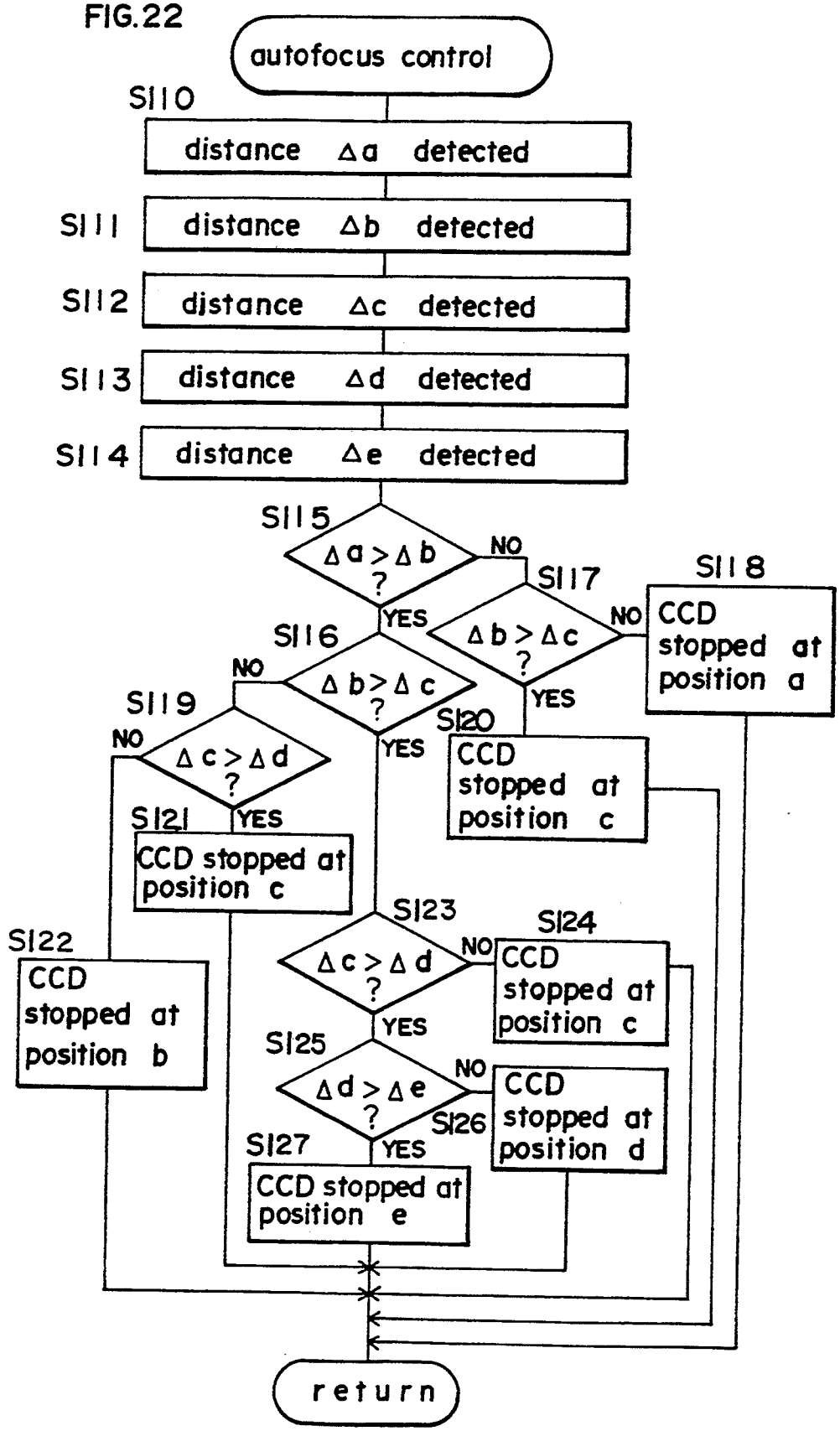

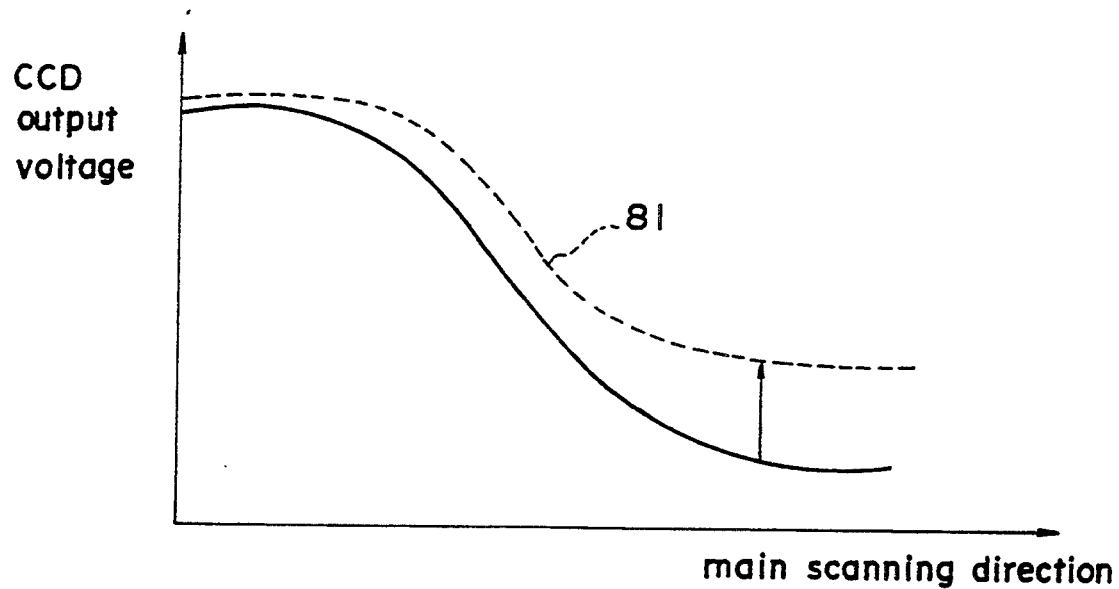
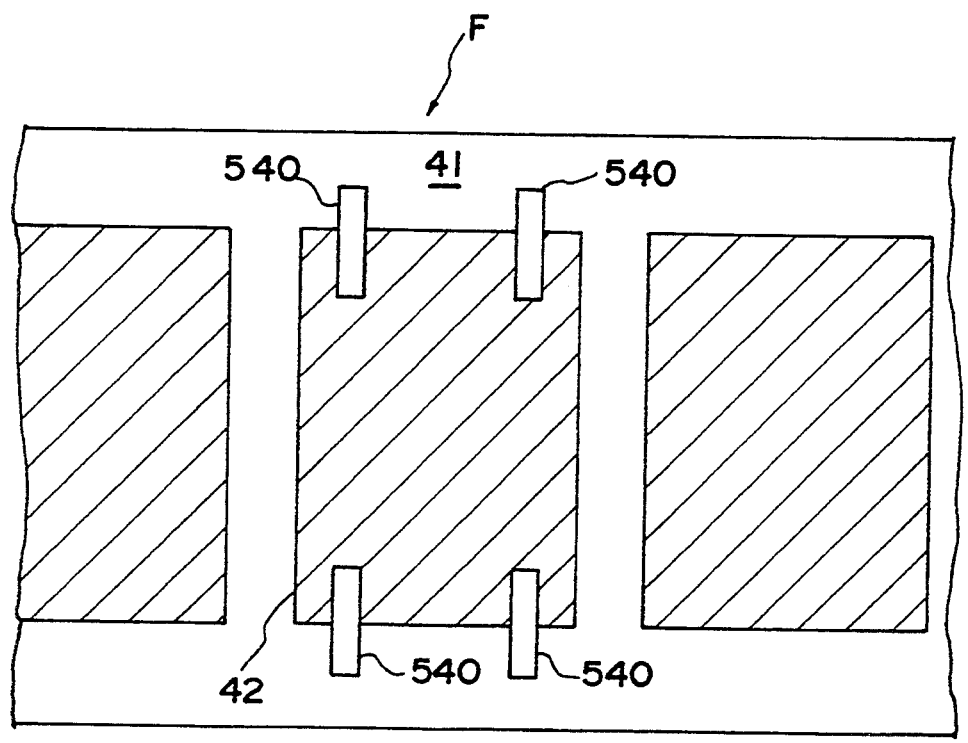
FIG.30

AUTOMATED FOCUS POINT CONTROL DEVICE

BACKGROUND OF THE INVENTION

1. Field of the Invention

The present invention relates to an automated focus point control device, and more specifically relates to an automated focus point control device for use with microfilm readers and the like.

2. Description of the Related Art

In conventional microfilm readers and the like, automated focus point control devices (autofocus mechanisms) are known which automatically focus the film image when forming said microfilm image on a screen or the like. Such an automated focus point control device comprises photoreceptor elements such as CCD line sensors or the like which detect the film image passing through a lens, and a control device for controlling the lens position and the like. When a film image is focussed in the CCD line sensor, the difference between the light portions and the dark portions of the film image (image contrast) is at its greatest. The control device is used to control the position of the lens so as to align the focus of the film image projection detected by the CCD line sensor.

When the contrast of the film image area detected by the CCD line sensor is slight, e.g., when the film image area lacks distinct edges or the like, it is difficult to accurately judge whether or not the image is in focus. In such a case, the aforesaid automated focus point control device searches for the area of highest contrast in the film image and it is this area which is detected by the CCD line sensor so as to accurately control the autofocus function.

However, the automated focus point control device of the aforesaid type must search for a film image area having a contrast of a predetermined value or greater. Consequently, there is an inherent disadvantage inasmuch as substantial time may be required to accomplish said autofocus control.

Automated focus point control devices have also been provided wherein the autofocus is controlled by detecting an edge portion of a blip mark used for detecting an image recorded outside the frame of the film image. The aforesaid blip mark typically is a rectangular graphic image recorded in the white area of the film.

The position and size of the aforesaid blip mark differs in accordance with the type of film and the like. Therefore, the position of the blip mark must be detected by the CCD line sensor or the like prior to detecting an edge portion of said blip mark. Accordingly, the automated focus point control device of the aforesaid type also has certain inherent disadvantages inasmuch as a long time may be required to adjust the focus.

Two types of methods are used in the automated focus point control device to detect the area of highest contrast within the film image. These two types of methods are described hereinafter.

A first method moves the projection lens between a position nearest the object side to a position nearest the image side and sequentially calculates the difference in contrast between the contrast of the former position and the contrast of the subsequent position, such that the point at which the value of said difference changes from a positive value to zero or a negative value is designated the focus position.

A second method detects the contrast throughout the entire range from a position nearest the object side to a position nearest the image side, and designates the position of maximum contrast therebetween as the focus position.

However, the aforesaid second method must move once the optical elements of the image forming system from a position nearest the object side to a position nearest the image side to detect the contrast throughout the entire range. The automated focus point adjustment therefore requires a long length of time because the optical elements of the image forming system must be again moved to the focus position after the focus position is determined.

The aforesaid first method also requires a long length of time for automated focus point adjustment when the focus position of the optical elements of the image forming system is separated from the start position of the aforesaid movement of the image forming system.

SUMMARY OF THE INVENTION

A main object of the present invention is to provide an automated focus point control device for an image reader capable of rapidly focussing a projected image.

Another object of the present invention is to provide an automated focus point control device for an image reader capable of adjusting, in a short time, the position of the optical unit at a position of maximum difference between the light portion and the dark portion of a projected image.

These and other objects of the present invention are accomplished by providing the automated focus point control device described below.

An automated focus point control device comprising:

a projection optical unit for projecting light transmitted through a film onto a projection surface, said film having a frame portion and a margin portion;

detecting means for detecting light transmitted through at least one boundary portion of said frame portion and said margin portion in the film and outputting detection signals; and control means for aligning the focus point of an image projected onto the projection surface by adjusting said projection optical unit based on the detection signals of the detecting means so as to maximize the contrast of the transmitted light of the boundary portion.

These and other objects of the present invention are accomplished by providing an automated focus point control device comprising:

a projection optical unit for projecting an object image to a predetermined position;

detecting means for detecting the contrast of a projected image on said predetermined position and outputting the contrast;

moving means for moving said detecting means so as to output the contrast at a plurality of points including the center position and lateral positions at both sides of the position adjusting range of said projection optical unit;

first determining means for determining an in-focus condition when the contrast at the center position is greatest, and determining an out-of-focus condition when the contrast at the center position is not greatest;

control means for controlling said moving means so as to further move the detecting means toward the higher contrast position after checking the higher contrast between the lateral positions when the out-of-focus condition is determined; and second determining means for determining the in-focus condition when the contrast output from the detecting means which is moved toward the higher contrast position is greatest.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 22 is a flow chart showing the contents of the autofocus control of the sixth embodiment of the invention;

FIG. 29 is a graph showing the CCD output voltage of the seventh embodiment of the present invention;

FIG. 30 is an illustration showing the positional relationship of the film and the CCD detecting area in the seventh embodiment of the present invention.

DETAILED DESCRIPTION OF THE PREFERRED EMBODIMENTS

The preferred embodiments of the present invention are described hereinafter with reference to the accompanying drawings.

Figure 1:
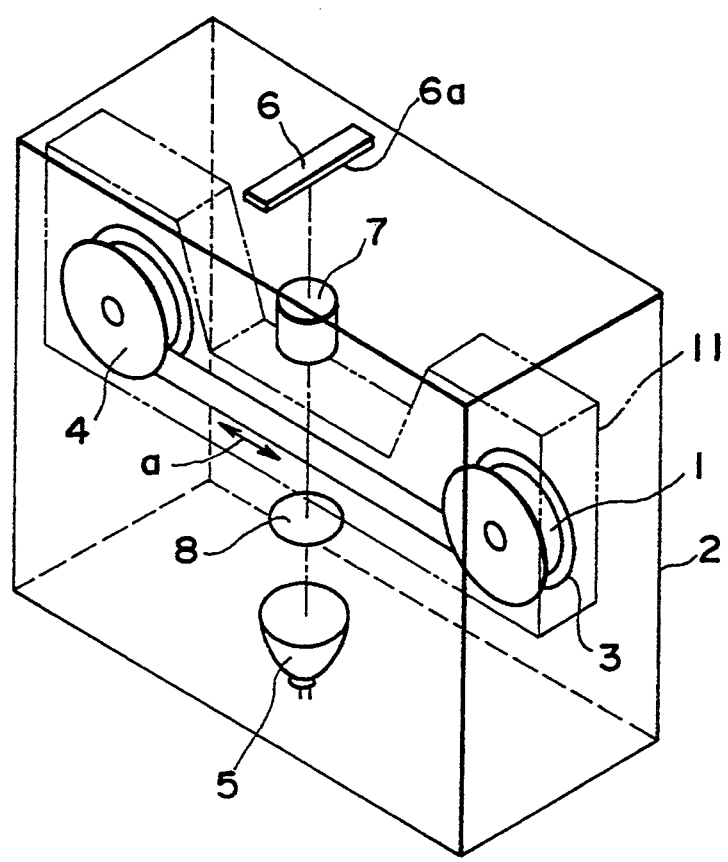
FIG. 1 is a perspective view showing the general construction of a microfilm image reader applying the first through fifth embodiments of the present invention.

FIG. 1 shows the general construction of an image reader for reading microfilm images using the present invention.

This device uses a 16 mm microfilm roll 1 loaded in a body 2.

The microfilm 1 is wound upon a reel 3, which is also loaded in the body 2. The microfilm 1 on the loaded reel 3 is fed in the direction indicated by the arrow {a} via winding of the winding reel 4, so as to read specific images.

A halogen lamp 5 for illuminating the fed image frame, CCD image sensor 6 for reading the image, and projection lens 7 for forming the illuminated image on the sensor surface 6a of the CCD image sensor 6 are provided at the image reading position. Reference number 8 refers to a condenser lens.

The CCD image sensor 6 is a line sensor, which is positioned such that the lengthwise direction of said line sensor is facing at a right angle relative to the lengthwise direction of the microfilm 1, i.e., the feed direction indicated by the aforesaid arrow "a." The CCD image sensor 6 reads images by scanning an image in a main scan direction perpendicular relative to the lengthwise direction of the microfilm 1.

Figure 2:
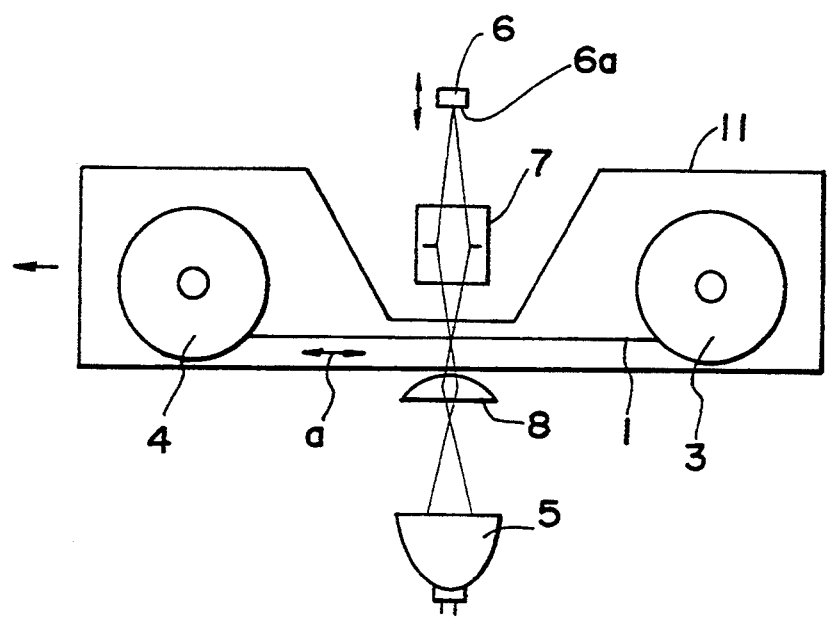
FIG. 2 is a section view showing the image reading section of the device of FIG. 1.

The reel 3 and winding reel 4 are supported by a film roll carrier 11 shown in FIG. 2 provided within the device 2. The frames of microfilm 1 are fed in the direction indicated by the arrow "a," and the image of one frame travels in the same direction and is subscanned, the reading of the image by the CCD image sensor 6 is accomplished for the entire image of one frame.

Automated focus point adjustment is accomplished to form a sharp image on the sensor surface 6a when an image is read.

The automated focus point adjustment in the present embodiment is accomplished by moving the CCD image sensor 6 in the direction of the optical axis. However, the automated focus point adjustment is not limited to the aforesaid method, inasmuch as the projection lens 7 also may be moved. That is, the relative positions of the optical elements of the image forming system are variable.

Figure 3:
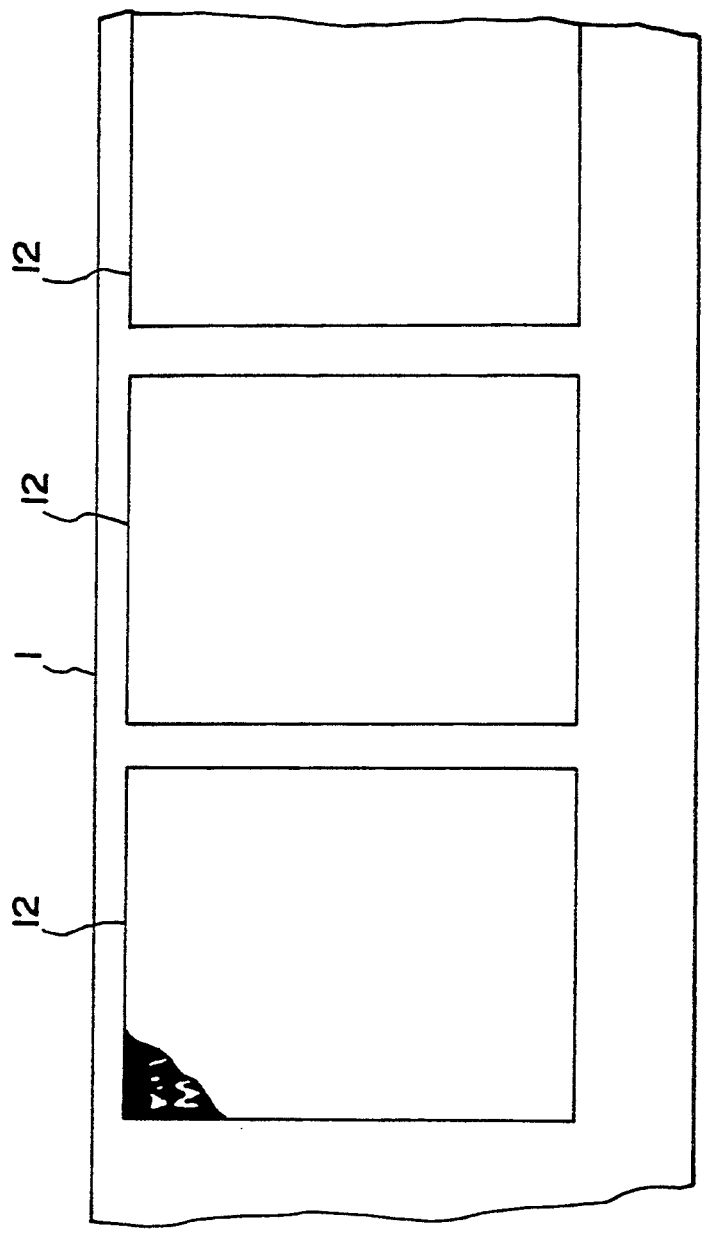
FIG. 3 is a top view showing the form of the microfilm image.

In the present embodiment, the reading object image is a negative image. FIG. 3 shows negative images 12 in several frames of the 16 mm microfilm 1.

Figure 4:
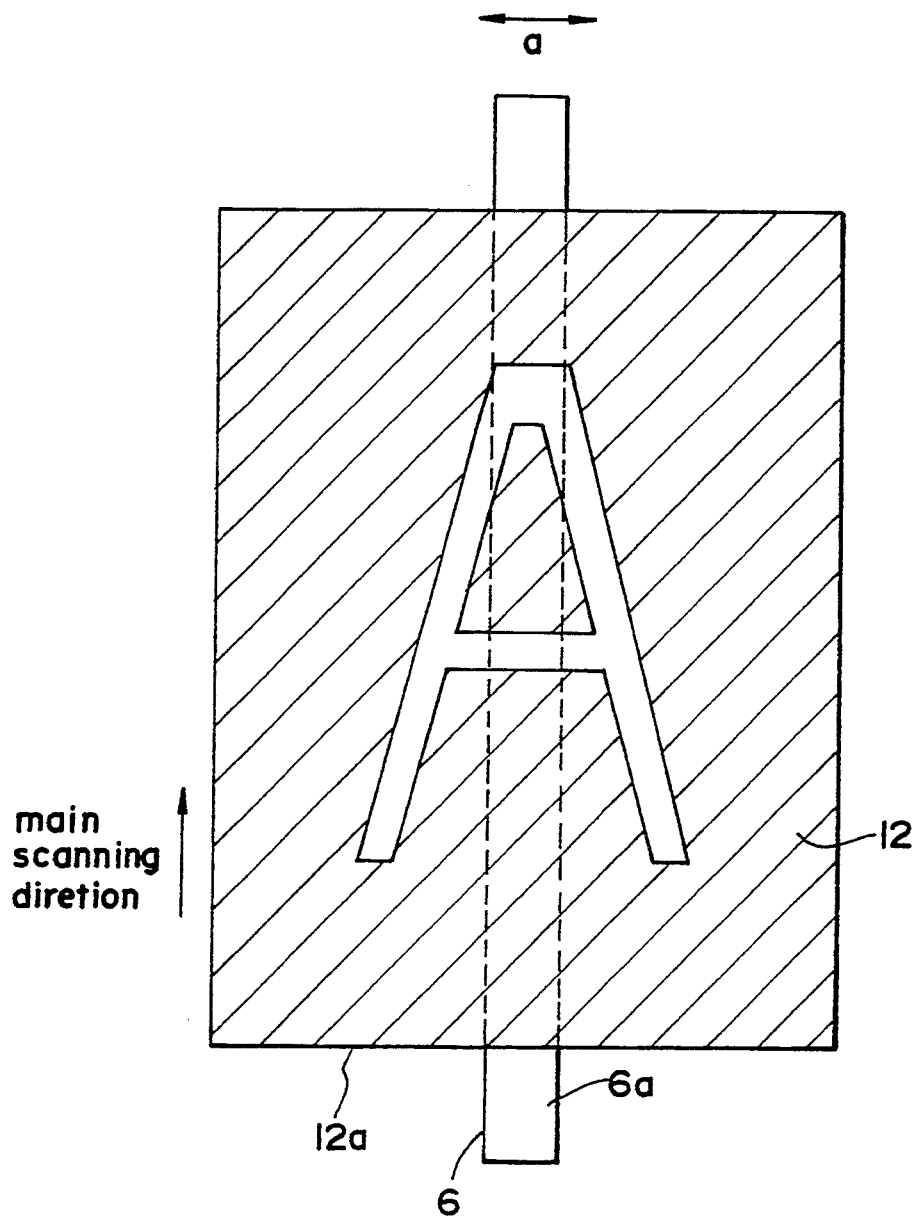
FIG. 4 is a top view showing the edge search state of the microfilm image.

In the present embodiment, when the maximum contrast between the image portion and the non-image portion at the edge section 12a of the negative image 12 is maximum as shown in FIG. 4, the image forming system determines the focussing state and the CCD image sensor 6 is stopped at this position to read the image.

Figure 5:
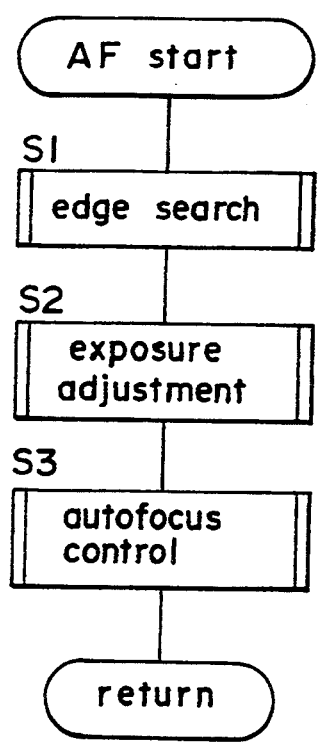
FIG. 5 is a flow chart showing the autofocus control of the device in FIG. 1.
Figure 6:
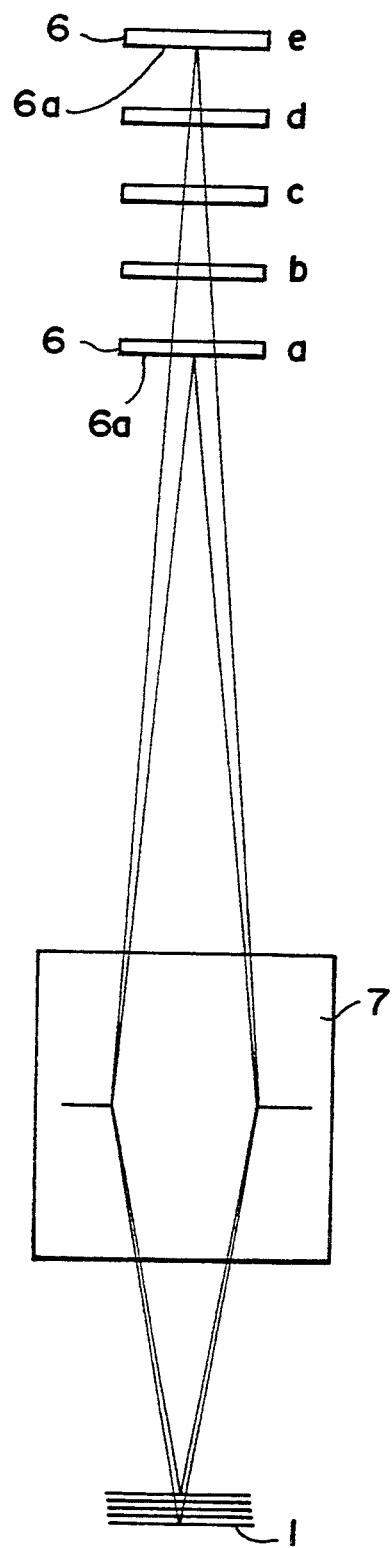
FIG. 6 is an illustration showing the focus point adjusting state of the image reader section of FIG. 2.

FIG. 5 is a flow chart showing the general automated focus adjustment. The automated focus adjustment is described below with reference to the flow chart.

First, the edge search process is executed in step S1. This process moves the microfilm 1 in the lengthwise direction indicated by the arrow "a" so that the CCD image sensor 6 is positioned at the center of the image 12 in the subscanning direction, as shown in FIG. 3. Accordingly, the edge 12a of the image 12 corresponds precisely to the predetermined position of the sensor surface 6a of the CCD image sensor 6.

Then, the exposure adjustment process is executed in step S2. This process sets the amount of exposure light produced via image signals when the image is read. More specifically, the difference between the signals produced by reading the white portions of the image and the signals produced by reading the black portions of the image is adjusted so as to obtained a predetermined value.

Finally, the autofocus control process is executed in step S3. This process executes controls that detect the contrast at each position when the CCD image sensor 6 is moved from the extreme object side position "a" to the extreme image side position "e" with positionally adjustment made in five stages, and determines the position of maximum contrast as the focus position.

Figure 7:
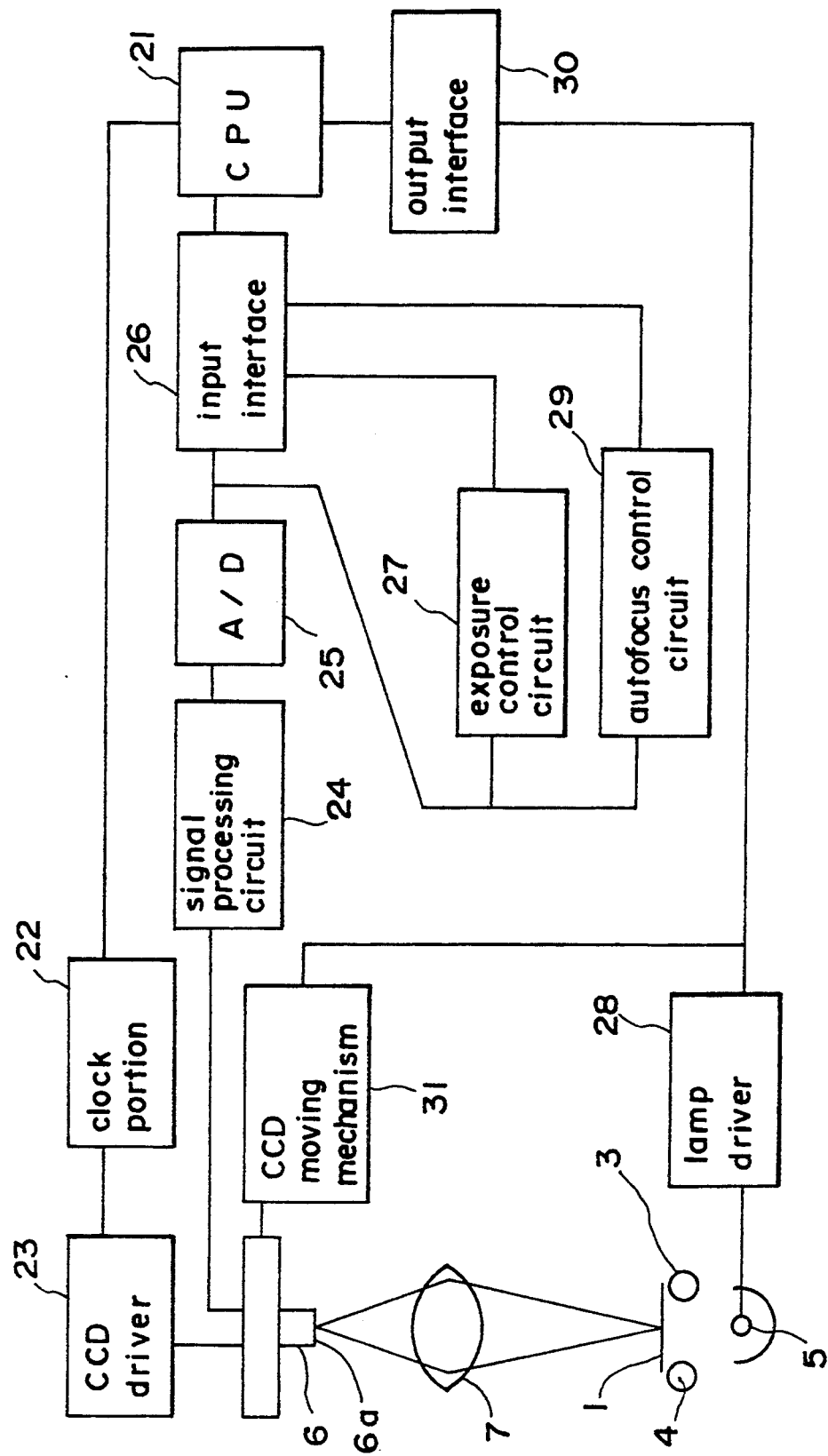
FIG. 7 is a control circuit diagram of the device of FIG. 1.

FIG. 7 shows the control circuit for executing control. Control is accomplished via the CPU 21. The CCD image sensor 6 outputs image signals synchronously with the image reading control by the CPU 21, said clock signals being received by the CCD driver 23 supported by the clock signals from the clock portion 22 based on the CPU 21.

The output of the CCD image sensor 6 is input to the CPU 21 via the signal processing circuit 24, analog-to-digital (A/D) converter 25, and input interface 26.

The exposure control circuit 27 for regulating exposure calculates the amount of exposure light at the instant the signal is received from the A/D converter 25, and inputs the calculated value to the CPU 21 via the input interface 26. The CPU 21 controls the lamp driver 28 via the output interface 30 in accordance with the aforesaid input, so as to set the amount of exposure at a predetermined amount.

The autofocus control circuit 29 for automated focus point adjustment also receives signals from the A/D converter 25 and calculates the contrast at each contrast detecting position, and inputs the calculated value to the CPU 21 via the input interface S0. At this time, the CPU 21 controls the CCD image sensor 6 moving mechanism via the output interface 30, so as to move the CCD image sensor 6 to each detecting position.

The focus state determining sequence is described hereinafter. At predetermined intervals the autofocus control circuit 29 samples the data corresponding to the edge portion 12a of the image 12 from among the output signals of the CCD image sensor 6 subjected to digital conversion by the A/D converter 25, and generates data as shown in FIG. 8.

The number of data samples falling within the range of predetermined threshold voltage values $V_H$ and $V_L$ among the sampled data are counted and input to the CPU 21.

Figure 8:
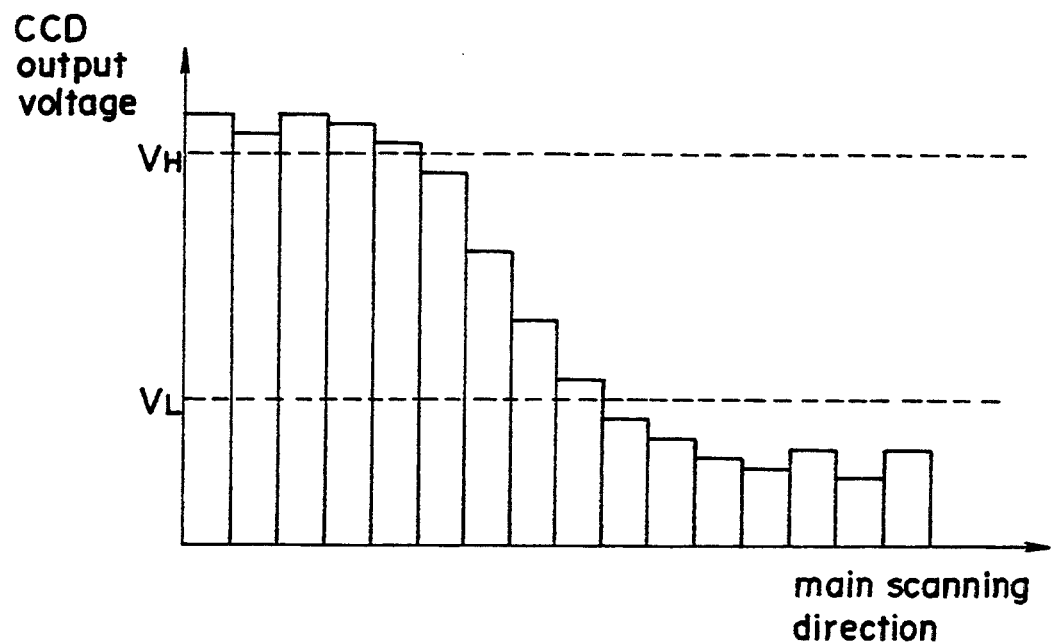
FIG. 8 is a graph showing an example of the output voltage data of the CCD image sensor when contrast is detected.
Figure 9:
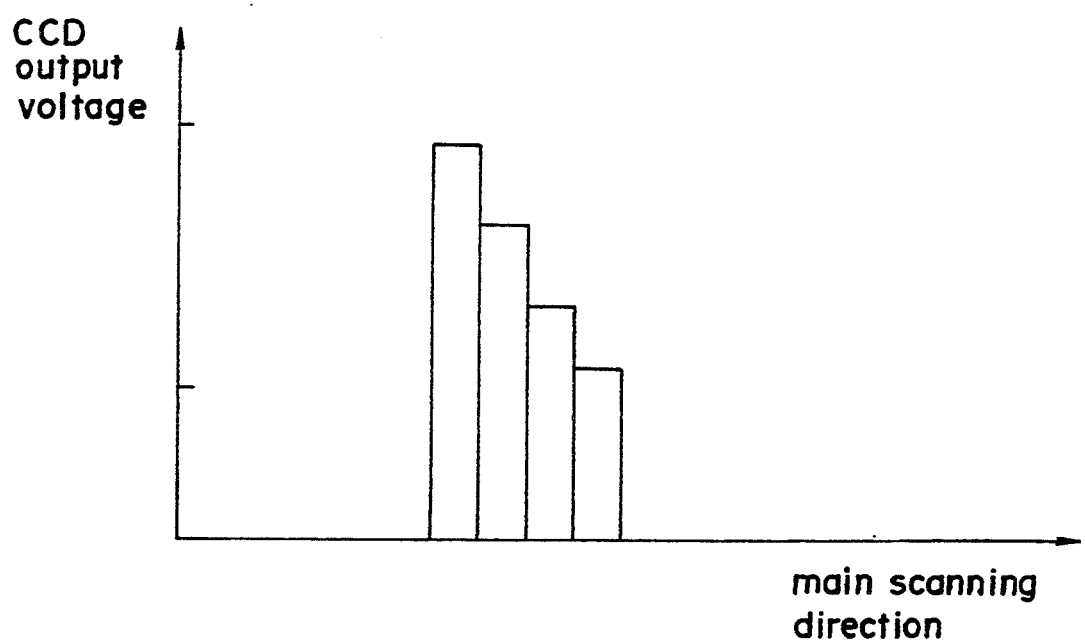
FIG. 9 is a graph showing the data portion input between threshold values in the output voltages of FIG. 8.

In FIG. 8, four sample data fall between the threshold values $V_H$ and $V_L$. These data are shown in FIG. 9.

Figure 10:
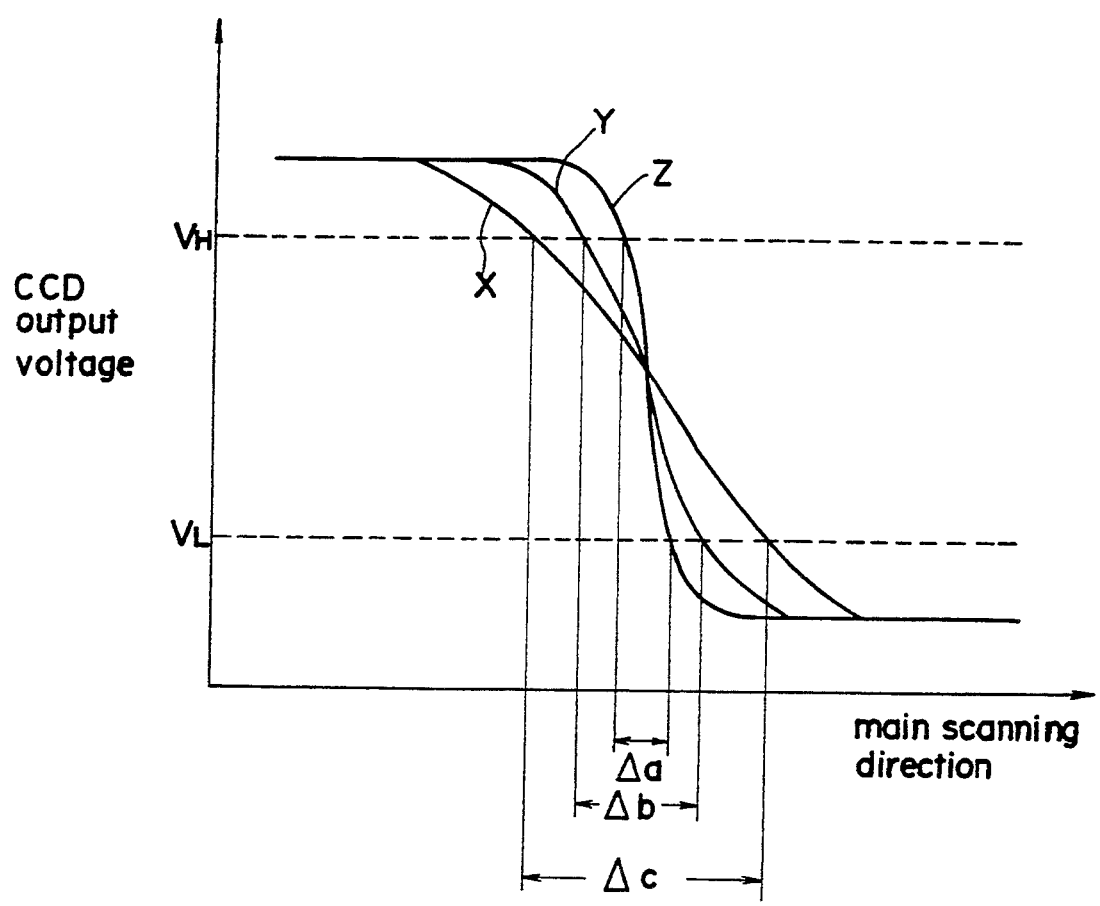
FIG. 10 is a graph showing the relationship between examples of CCD image sensor output voltage data of each focus point adjustment position and the distance between threshold values thereof.

FIG. 10 shows the curves X, Y and Z as examples of the output voltage of the CCD image sensor 6 at positions a, b and c.

In the curves X, Y and Z, the distance in the main scanning direction corresponding to the threshold voltage values $V_H$ and $V_L$ becomes $\Delta a$, $\Delta b$ and $\Delta c$, respectively. These distances $\Delta a$, $\Delta b$ and $\Delta c$ become shorter in the order $\Delta c$, $\Delta b$ and $\Delta a$ in accordance with the focus points of the images projected on the CCD image sensor 6.

This distance corresponds to the number of data between the threshold voltage values $V_H$ and $V_L$. The CPU 21 determines the distance between threshold values based on the number of data input from the autofocus control circuit 29, and determines the contrast of the image projected on the CCD image sensor 6.

Figure 12:
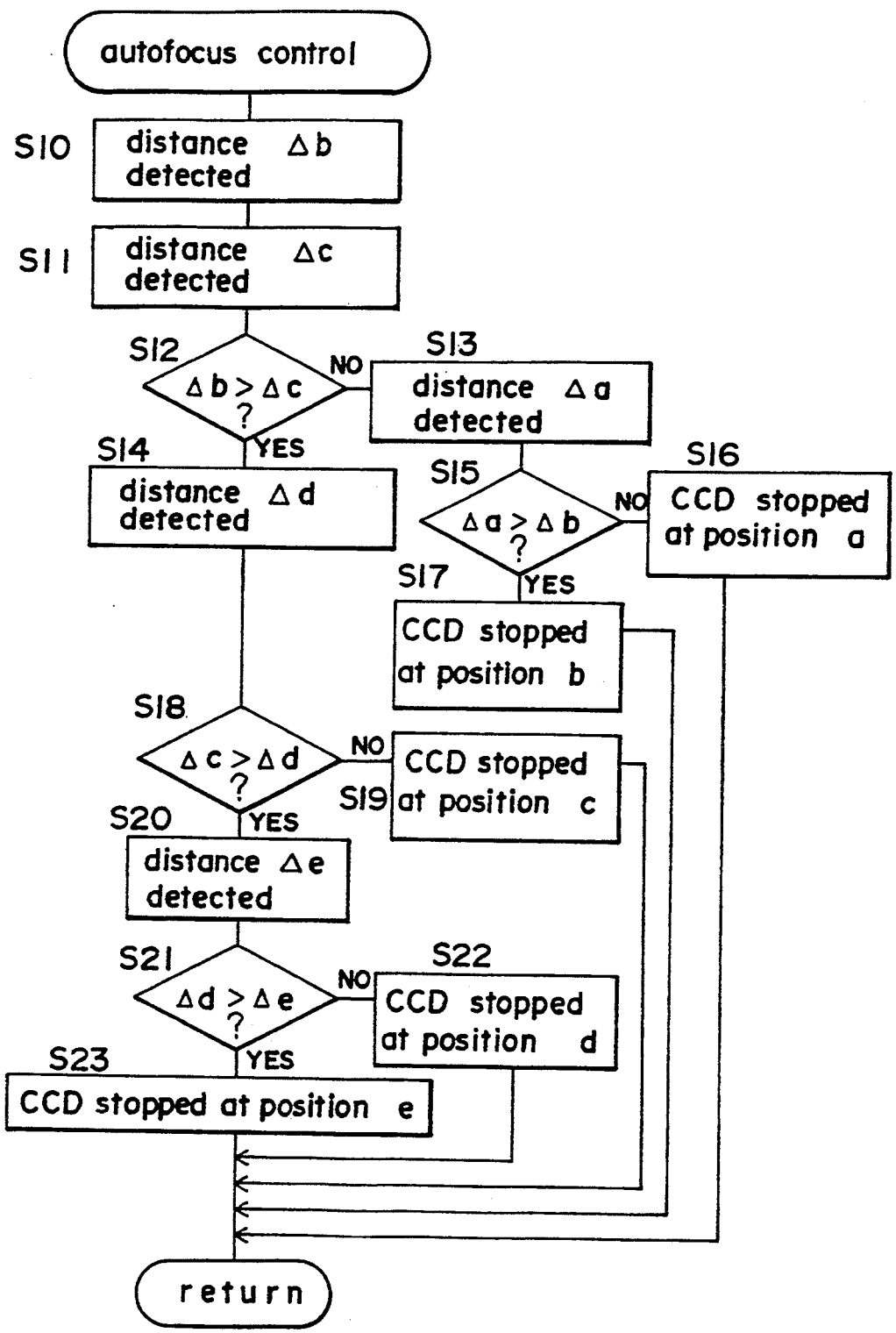
FIG. 12 is a flow chart showing the contents of the autofocus control in the first embodiment of the present invention.

FIG. 12 graphically shows the autofocus control executed by the control circuit in the embodiment shown in FIG. 7, and which is described hereinafter.

First, the CCD image sensor 6 is moved to position b in step S10, and the distance $\Delta b$ between thresholds is detected at this position.

Then, in step S12, the CCD image sensor 6 is moved to the adjacent position c on the center position side, and the distance $\Delta c$ between thresholds is detected.

Thereafter, a check is made to determine whether or not $\Delta b > \Delta c$. If $\Delta b > \Delta c$, the focus position is believed to be on the position c side, i.e., the side of the smallest threshold distance, such that the CCD image sensor 6 is moved to the position d, i.e., the next position on the position c side, and the distance $\Delta d$ between thresholds is detected, as described by the dashed line in FIG. 13a. When $\Delta b$ is not greater than $\Delta c$, the focus position is believed to be the position b side of the smallest distance between thresholds, such that the CCD image sensor 6 is moved to position a in step S13, and the distance $\Delta a$ between thresholds is detected, as described by the dashed line in FIG. 13b.

Figure 11:
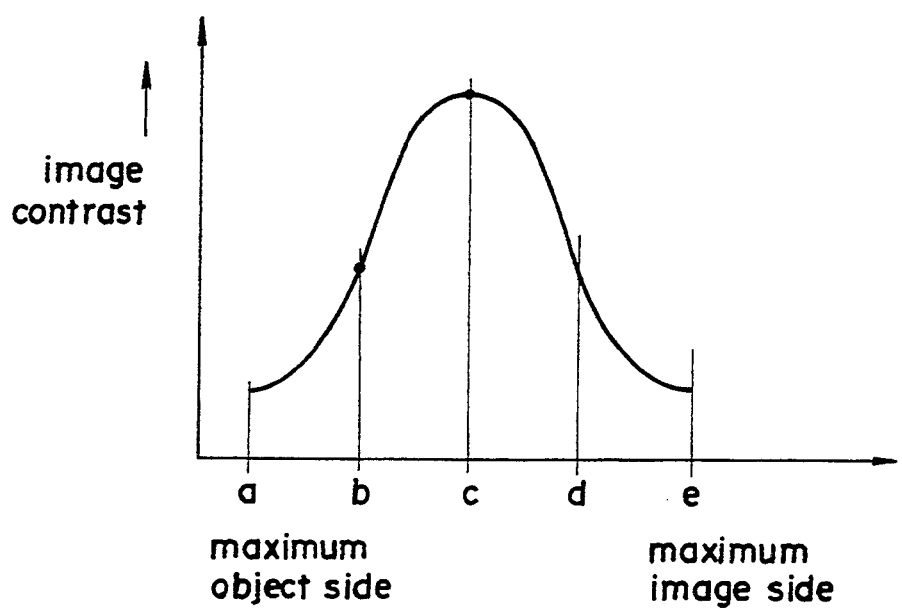
FIG. 11 is a graph showing the normal distribution of image contrast when the focus position is the center position of the focus point adjusting range.

According to the conventional first method, when, for example, the position c is set as the focus position of highest contrast, as shown in FIG. 11, the characteristic of reduced contrast occurs from said focus position to positions b, a, with the extreme object side moving sequentially, and positions d, e, and the extreme subject side moving sequentially.

Figure 13A:
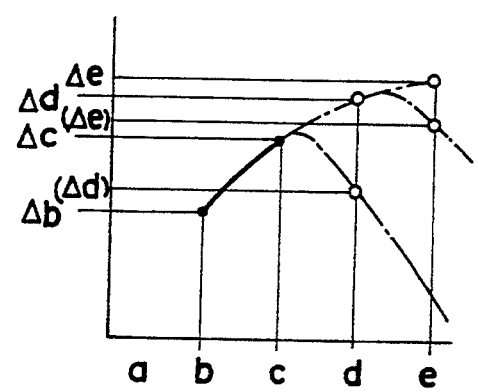
FIGS. 13(a) and 13(b) are graphs showing the focus point adjustment state in the control shown in FIG. 12.
Figure 13B:
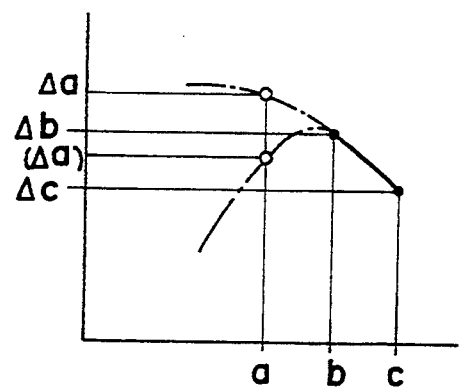

From this characteristic the focus, position can be determined by moving the CCD image sensor 6 toward the aforesaid two positions of lower contrast and omitting the contrast detection and calculation processes because the probability is high that the position of maximum contrast detection will be as indicated by the dashed line in FIGS. 13(a) and 13(b), on the high contrast side of the two prioritized contrast detected points of b and c.

The focus position of maximum contrast can be determined while moving the CCD image sensor 6 toward the high contrast side by determining which detected contrast is greatest at each position, i.e., determining whether or not the difference of one detection value and the subsequent detection value changes from a positive value to zero or a negative value.

In the present case, the difference changes to a negative value. Thus, when the relation $\Delta b > \Delta c$ is obtained, after the CCD image sensor is moved to position d and the contrast $\Delta d$ is detected in step S14, a determination is made in step S18 as to whether or not the relation $\Delta c > \Delta d$ is obtained.

If $\Delta c > \Delta d$, the difference between the previous detection value and the current detection value is positive. Therefore, after the CCD image sensor 6 is moved to position e and the contrast $\Delta e$ is detected in step S20 as shown in FIG. 13($a$), a determination is made in step S21 as to whether or not the relation $\Delta d > \Delta e$ is obtained.

If $\Delta d > \Delta e$, there are no other focus point adjustment positions. Therefore, in step S23, the CCD image sensor 6 is stopped at position e as the adjustment boundary, and the automated focus point adjustment is completed.

If, however, the relation $\Delta c > \Delta d$ is not obtained, the difference between the previous measured value and the current measured value is negative. The contrast distribution in this case is expressed by the imaginary line shown in FIG. 13$a$.

In this case, the position of maximum contrast is between position c and position d. Since the high contrast side is adjacent thereto, in step S19 the CCD image sensor 6 is moved and stopped at position c which is nearest the high contrast side among the two positions c and d, and the automated focus point adjustment is completed.

If, however, the relation $\Delta d > \Delta e$ is not obtained in the aforesaid determination, the difference between the previous measured value and the current measured value is negative. The contrast distribution in this case is indicated by the dashed line shown in FIG. 13$a$. Using the same logic as in the previous example, in step S22 the CCD image sensor 6 is moved and stopped at the position d as the focus position, and the automated focus point adjustment is completed.

On the other hand, if the relation $\Delta b > \Delta b$ is not obtained, the CCD image sensor 6 is moved to position a. When the distance $\Delta a$ between thresholds is detected as shown in FIG. 13$b$, subsequently in step S15, a check is made to determine whether or not $\Delta a > \Delta b$. If the relation $\Delta a > \Delta b$ is not obtained, the difference between the previous measured value and the current measured value is positive and the contrast distribution is indicated by the dashed line in FIG. 13$b$. Since there are no more focus point adjustment positions on the positive side, in step S16 the CCD image sensor 6 is stopped at position a as the focus point adjustment boundary, and the automated focus point adjustment is completed.

If the relation $\Delta a > \Delta b$ is obtained, the difference between the previously measured value and the current measured value is negative. In this case, the contrast distribution is indicated by the imaginary line in FIG. 13$b$. Since position b is nearest the position of maximum contrast, in step S17 the CCD image sensor 6 is moved to position b and stopped, and the automated focus point adjustment is completed.

Figure 14:
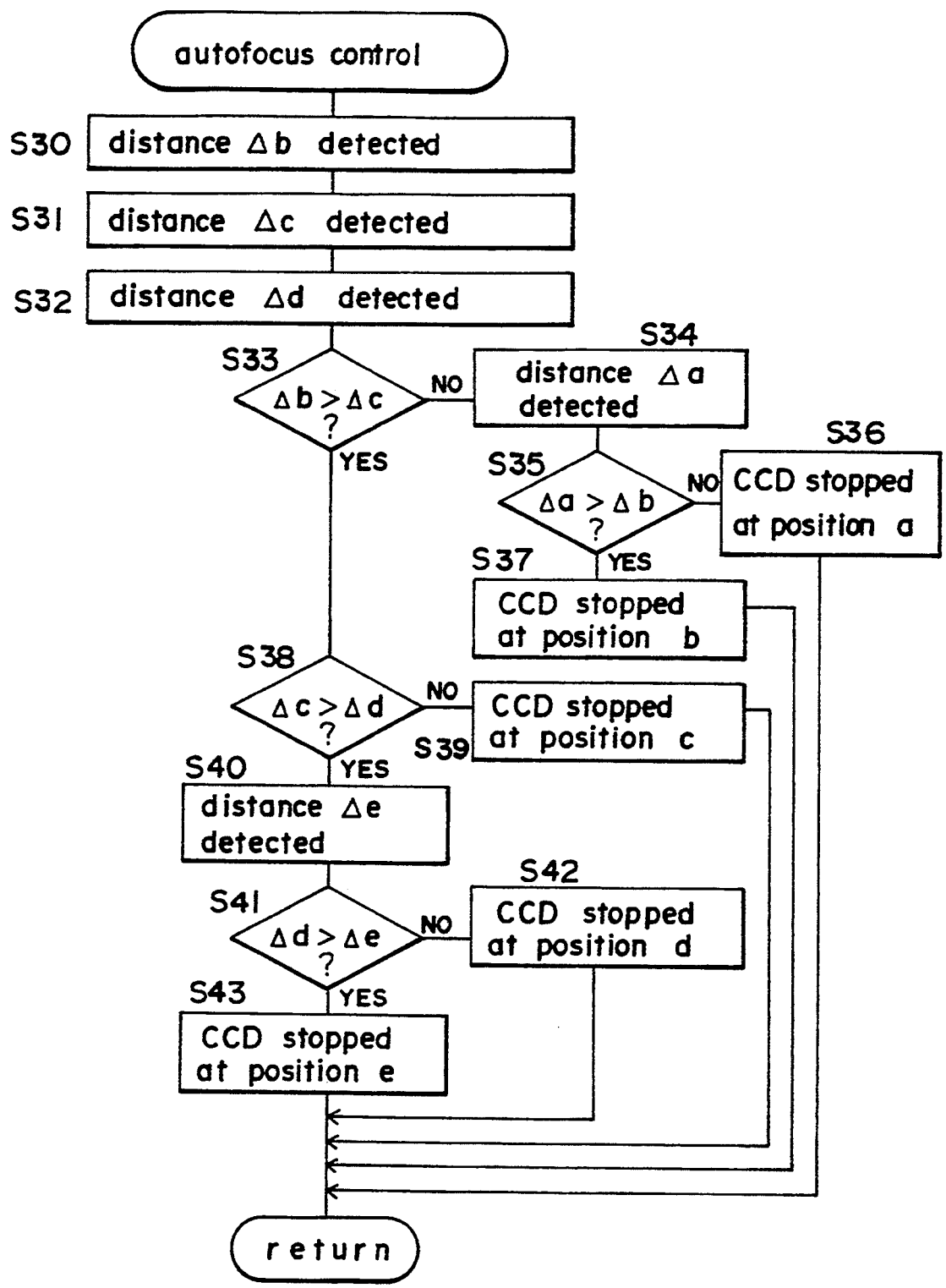
FIG. 14 is a flow chart showing the contents of the autofocus control of the second embodiment of the invention.
Figure 15A:
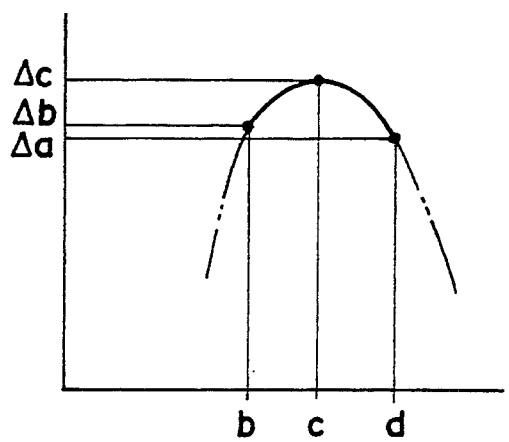
FIGS. 15(a), 15(b) and 15(c) are graphs showing the focus point adjustment state in the control of FIG. 14.
Figure 15B:
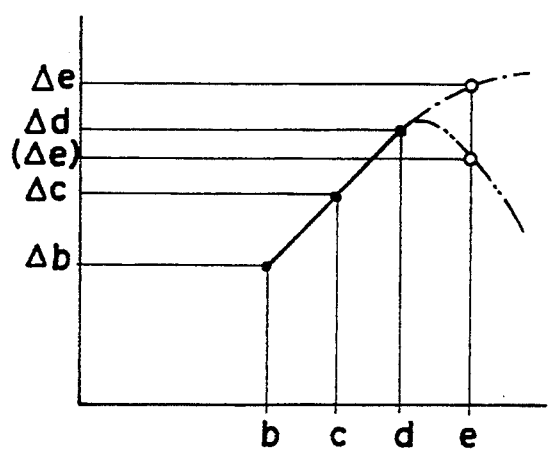
Figure 15C:
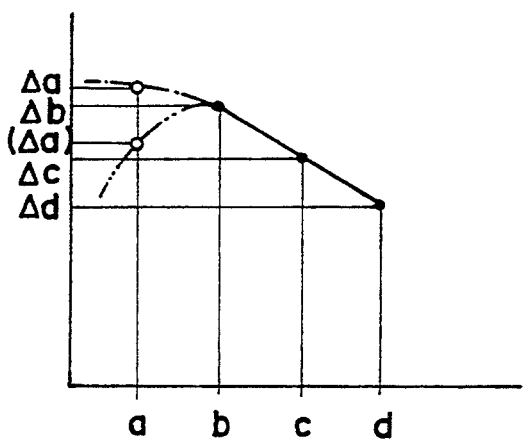

FIGS. 14 and 15 show a second embodiment of the invention. In this embodiment, the contrast is detected at three points within a focus point adjustment range of center position c and positions a and b disposed on either side thereof on a prioritized basis. The CCD image sensor 6 is moved to the area of lowest contrast among the aforesaid three positions as the lower limit, contrast detection and calculation are omitted, and focus position is determined.

FIG. 14 shows a flow chart of the autofocus control process of the present embodiment.

In steps S30, S31 and S32, the CCD image sensor 6 is moved to positions b, c and d, and detects the distances between thresholds $\Delta b$, $\Delta c$, $\Delta d$ at these positions.

Then, in step S33, a check is made to determine whether or not $\Delta b > \Delta b$. In step S38, when the relation $\Delta c > \Delta d$ is obtained, the contrast distribution is as shown in FIG. 15$a$, such that position c is the focus position. Accordingly, in step S39, the CCD image sensor 6 is moved to position c and stopped, and the automated focus point adjustment is completed.

When the relation $\Delta b > \Delta c$ is obtained in step S33, and the relation $\Delta c > \Delta d$ is obtained in step S38, the difference between the previous measured value and the current measured value is positive. Therefore, after the CCD image sensor 6 is moved to the next position e and the contrast $\Delta e$ is detected in step S40, a determination is made in step S41 as to whether or not the relation $\Delta d > \Delta e$ is obtained.

If the relation $\Delta d > \Delta e$ is obtained, the difference between the previous measured value and the current measured value is positive. In this case the contrast distribution is indicated by the dashed line shown in FIG. 15$b$. Since the contrast distribution is at the focus point boundary position, the CCD image sensor 6 is stopped at position e in step S43, and the automated focus point adjustment is completed.

If the relation $\Delta d > \Delta e$ is not obtained, the contrast distribution at this time is described by the imaginary line in FIG. 15$b$. Since position d is near the focus position, the CCD image sensor 6 is moved to the position d and stopped in step S42, and the automated focus point adjustment is completed.

When the check is made in step S33 to determine whether or not $\Delta b > \Delta b$, and the relation $\Delta b > \Delta b$ is not obtained, in step S34 the CCD image sensor 6 is moved to position a and the distance $\Delta a$ between thresholds is detected, and thereafter in step S35 a determination is made to whether or not $\Delta a > \Delta b$.

When the relation $\Delta a > \Delta b$ is not obtained in step S35, the contrast distribution is indicated by the dashed line shown in FIG. 15$c$. Since the contrast distribution is at the focus point adjustment boundary position, in step S36 the CCD image sensor 6 is moved to position a and stopped, and the automated focus point adjustment is completed.

When the relation $\Delta a > \Delta b$ is obtained, the contrast distribution is indicated by the imaginary line in FIG. 15$c$. Since position b is determined to be near the focus position, in step S37 the CCD image sensor 6 is moved to position b and stopped, and the automated focus position adjustment is completed.

Figure 16:
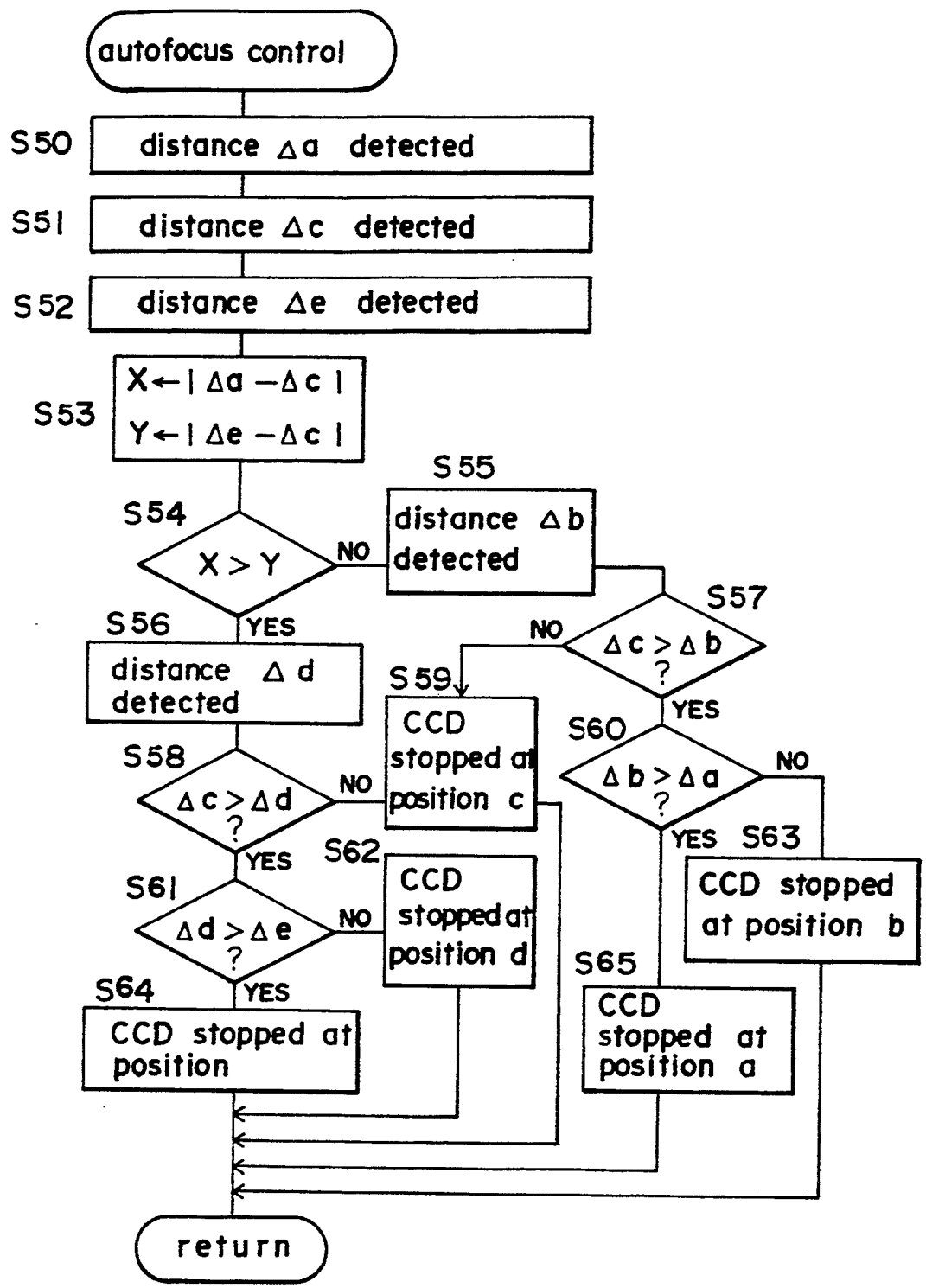
FIG. 16 is a flow chart showing the contents of the autofocus control of the third embodiment of the invention.
Figure 17:
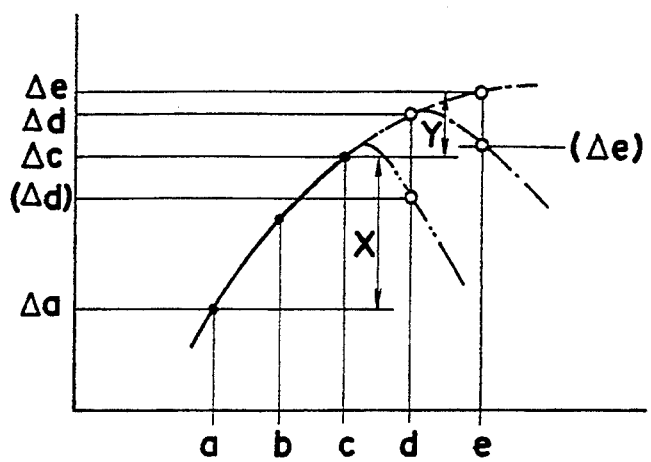
FIG. 17 is a graph showing the focus point adjustment state in the control of FIG. 16.

FIGS. 16 and 17 shows a third embodiment of the invention. In this embodiment, the contrast is detected at three points within a focus point adjustment range of center position c and the extreme object side position and the extreme image side position disposed on either side thereof on a prioritized basis. The CCD image sensor 6 is stopped and contrast detection and calculations are performed a few times for focus determination, such that the automated focus point adjustment may be readily accomplished in a very short time.

FIG. 16 is a flow chart of the autofocus control process of the present embodiment.

In steps S50, S51 and S52, the CCD image sensor 6 is sequentially moved from the extreme object side position a, center position c, and extreme image side position e. The distances $\Delta a$, $\Delta c$ and $\Delta d$ between thresholds are detected at each position a, c and e.

In step S53, $|\Delta a-\Delta c|$ and $|\Delta e-\Delta c|$ are calculated to derive the values X and Y. In step S54, a check is made to determine whether or not $X>Y$.

When $X>Y$, the focus position is determined to be the position of maximum contrast between the center position c, and the position e on the side having less difference in contrast with said position c as shown in FIG. 17.

In step S56, the CCD image sensor 6 is moved from the center position c to position d, and shifted one unit to position e. At this position the distance $\Delta d$ between thresholds is detected.

Then, if $\Delta c>\Delta d$ in step S58, and $\Delta d-\Delta e$ in step S61, the contrast distribution is described by the dashed line in FIG. 17.

In step S64, the CCD image sensor 6 is stopped at position e in consideration of the focus point adjustment boundary, and the automated focus point adjustment is completed.

If, however, the reply to the query in step S58 is that the relation $\Delta c>\Delta d$ is not obtained, the contrast distribution in this case is described by the imaginary line in FIG. 17. In step S59, the CCD image sensor 6 is moved to position c and stopped since position c is nearest the focus position, and the automated focus point adjustment is completed.

A check is made in step S61 to determine whether or not $\Delta d>\Delta e$. If the relation $\Delta d>\Delta e$ is not obtained, the contrast distribution is described by the double dashed line in FIG. 17. In step S62 the CCD image sensor 6 is moved to position d and stopped since position c is nearest the focus position, and the automated focus adjustment is completed.

On the other hand, when it is determined in step S54 that the relation $X>Y$ is not obtained, the focus position is considered to be on the position a side from the center position c. Therefore, in step S55, the CCD image sensor 6 is moved to position b and the distance $\Delta b$ between thresholds is detected, the CCD image sensor 6 is moved to the position a side of the center position c in an operation identical to that previously described and this position is the focus position, and the focus point adjustment is completed.

Accordingly, contrast detection is accomplished at the aforesaid three positions on a prioritized basis to determine whether the focus position is on the extreme object side or the extreme image side from the center position c. Stopping the CCD image sensor 6 on the non-focus position side, contrast detection and calculation can be omitted for this side.

Figure 19:
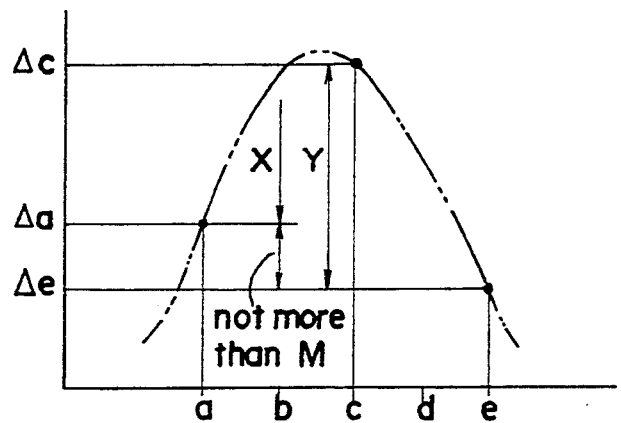
FIG. 19 is a graph showing the focus point adjustment state in the control of FIG. 18.
Figure 18:
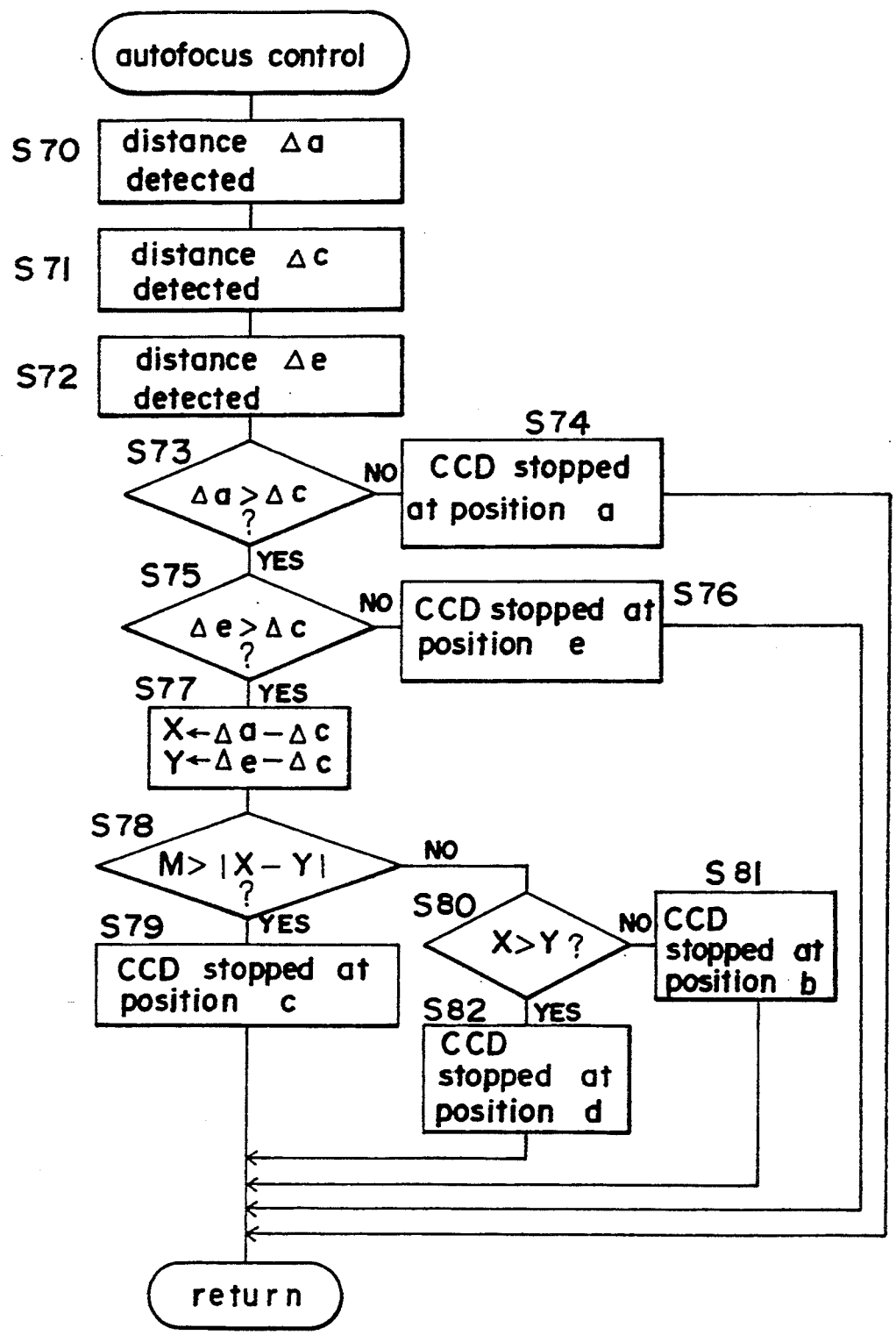
FIG. 18 is a flow chart showing the contents of the autofocus control of the fourth embodiment of the invention.

FIGS. 18 and 19 show a fourth embodiment of the invention. In this embodiment, the contrast is detected at three points within a focus point adjustment range of center position c and the extreme object side position a and the extreme image side position e disposed on either side thereof on a prioritized basis. The CCD image sensor 6 is stopped and contrast detection and calculations are performed a few times for focus determination, such that the automated focus point adjustment may be readily accomplished in a very short time.

FIG. 18 is a flow chart of the autofocus control process of the present embodiment.

In steps S70, S71 and S72, the CCD image sensor 6 is sequentially moved from the extreme object side position a, center position c, and extreme image side position e. The distances $\Delta a$, $\Delta c$ and $\Delta d$ between thresholds are detected at each position a, c and e.

When $\Delta a>\Delta c$ in step S73 and $\Delta e>\Delta c$ in step S75 and the distance $\Delta c$ between thresholds is minimal, the contrast of position c is greater than that of either position a or e. In step S77, $|\Delta a-\Delta c|$ and $|\Delta e-\Delta c|$ are calculated to derive the values X and Y. In step S78, a check is made to determine whether or not $|X-Y|$ is less than a predetermined value M.

When $|X-Y|$ is less than a predetermined value M, the contrast distribution is described by the imaginary line in FIG. 19. The position of maximum contrast is determined to be near the center position c.

Thus, the center position c is not prevented from being designated the focus position, and in step S79 the CCD image sensor 6 is moved to the center position c and stopped, and the automated focus point adjustment is completed.

When $|X-Y|$ is equal to or greater than a predetermined value M, the position of maximum contrast shifted significantly from the center position. In this case, the direction of the position shift is to the side having the smallest difference in contrast with position c, i.e., the position a side, as is clearly shown in FIG. 19.

If the relation $X>Y$ is not obtained in step S80, the focus position is shifted one position from the center position c on the position a side, i.e., to position b. In step S81, the CCD image sensor 6 is moved to position b and stopped, and the automated focus point adjustment is completed.

If, however, the relation $X>Y$ is obtained, the focus position is shifted one position from the center position c on the position e side, i.e., to position d. In-step S82, the CCD image sensor 6 is moved to position d and stopped, and the automated focus point adjustment is completed.

When the relation $\Delta a>\Delta c$ is not obtained in step S73, the contrast at position a is greater than that at the center position c, and set as the focus position because no other position has greater contrast. In step S74, the CCD image sensor 6 is moved to position a and stopped, and the automated focus position adjustment is completed.

When the relation $\Delta e>\Delta c$ is obtained in step S75, the focus position similarly is set at position e. In step S76, the CCD image sensor 6 is moved to position e and stopped, and the automated focus point adjustment is completed.

Figure 21:
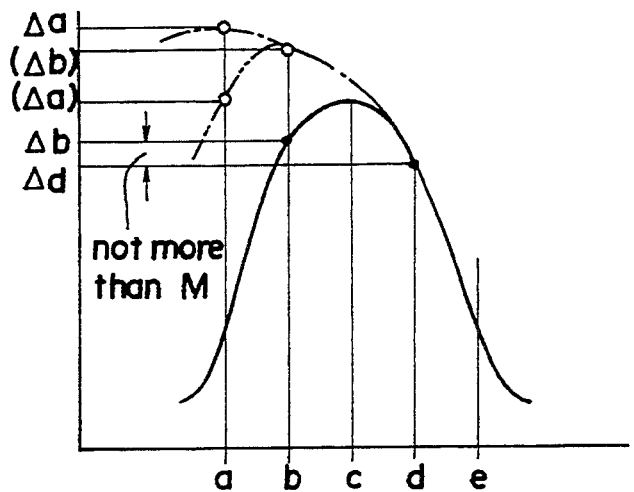
FIG. 21 is a graph showing the focus point adjustment state in the control of FIG. 20.
Figure 20:
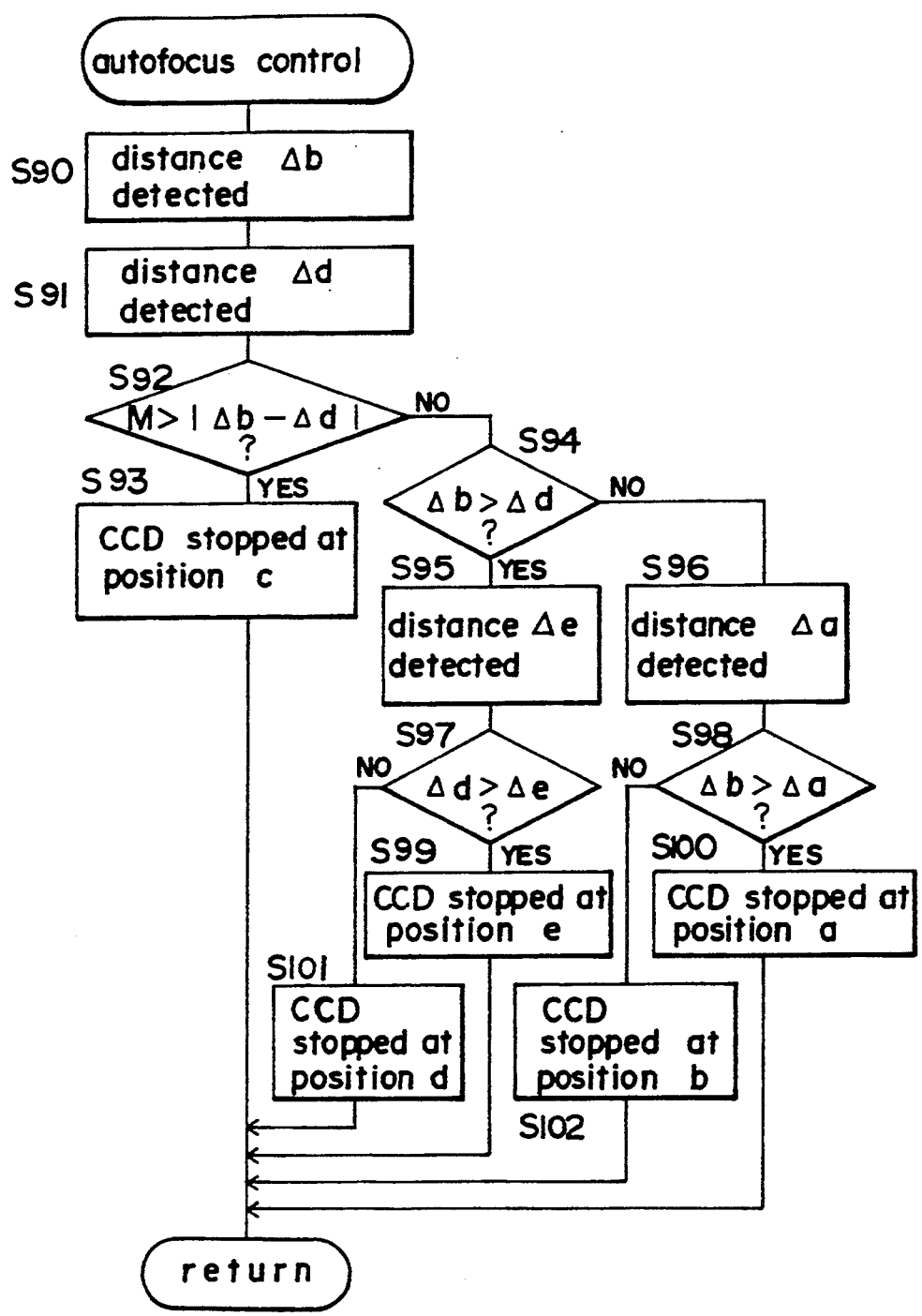
FIG. 20 is a flow chart showing the contents of the autofocus control of the fifth embodiment of the invention.

FIGS. 20 and 21 show a fifth embodiment of the invention, wherein the method of the fourth embodiment is adapted to the second embodiment.

FIG. 20 is a flow chart of the autofocus control process of the fifth embodiment.

In steps S90, S91 and S92, the CCD image sensor 6 is sequentially moved between the center position c, and positions b and d disposed on either side thereof. The distances $\Delta b$ and $\Delta d$ between thresholds are detected at each position b and d.

In step S92, a check is made to determine whether or not $|\Delta b-\Delta d|$ is less than a predetermined value M. When $|\Delta b-\Delta d|$ is less than a predetermined value M, the contrast distribution at the position of maximum contrast is near the center position c between the two positions b and d.

Accordingly, the center position c may be set as the focus position. In step S93, the CCD image sensor 6 is moved to the center position c and stopped, and the automated focus point adjustment is completed.

When $|\Delta b - \Delta d|$ is equal to or greater than a predetermined value M, the contrast distribution at the position of maximum contrast is shifted greatly from the center position e. At this time, the direction of position shift is to a position at which the distances $\Delta b$ and $-\Delta d$ between thresholds is smallest and the contrast is greatest, i.e., on the position b side in FIG. 21.

When the relation $\Delta b > \Delta d$ is not obtained in step S94, tile CCD image sensor 6 is moved in step S96 to the position b side from the center position c, i.e., to position a at which the contrast has not been detected. After the distance $\Delta a$ between thresholds is detected at this position, the relation $\Delta b > \Delta a$ is determined in step S98.

If the relation $\Delta b > \Delta a$ is obtained, the contrast distribution is described by the dashed line in FIG. 21. Position a is set as the focus position since it is within the focus point adjustment range. In step S100, the CCD image sensor 6 is moved to position a and stopped, and the automated focus point adjustment is completed.

If, however, the relation $\Delta b > \Delta$ is not obtained, the contrast distribution is described by the imaginary line in FIG. 21. Position b is set as the focus position. In step S102, the CCD image sensor 6 is moved to position b and stopped, and the automated focus point adjustment is completed.

If the relation $\Delta b > \Delta d$ is obtained in step S94, the position of maximum contrast distribution on the position d side of the center position c is shifted greatly. In step S95, the CCD image sensor 6 is moved to the position d side of the center position, i.e., to position e at which the contrast has not been detected, The distance $\Delta e$ between thresholds is detected at this point, and in step S97 either the position e or the position d is set as the focus position by the previously described discrimination method. In step S101 or step S102, the CCD image sensor 6 is moved to either position d or position e, respectively, and stopped, and the automated focus point adjustment is completed.

Accordingly, the CCD image sensor 6 is stopped at the center position c, and detecting and calculating contrast can be omitted in addition to the omissions in the fourth embodiment.

FIGS. 22 and 23 show a sixth embodiment of the invention. The contrast is detected at a plurality of detection positions to set the entire focus point adjustment range, and the focus position is set by the position of maximum contrast. When the aforesaid detection is incomplete or is defective, a pseudo process sets the center position c as the focus position so as to prevent a long time being expended on the defective detection which obstructs the automated focus point adjustment and disables the image reading.

FIG. 22 is a flow chart of the autofocus control process of the sixth embodiment.

In step S110-S114, the CCD image sensor 6 is sequentially moved to each position $b \approx d$ within an automated focus point adjustment range from an extreme subject side position a to an extreme image side position e. The distances $\Delta a$ through $\Delta e$ between thresholds are detected at each position a through e.

Figure 23A:
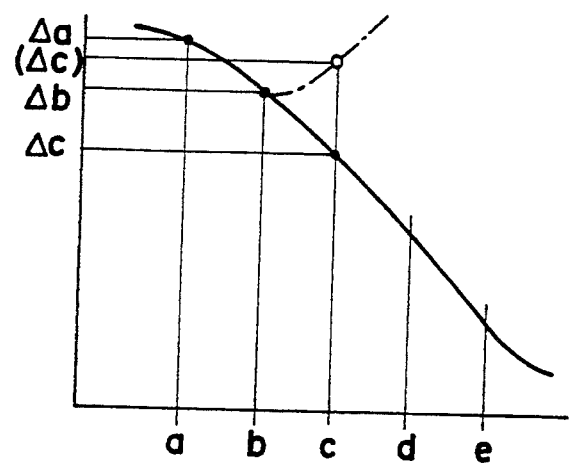
FIGS. 23(a), 23(b) and 23(c) are graphs showing the focus point adjustment states in the control of FIG. 22.

When the relation $\Delta a > \Delta b$ is not obtained in step S115 and the relation $\Delta b > \Delta b$ does not obtained in step S117, the contrast distribution is described by the solid line in FIG. 23a. The extreme object side position a, i.e., focus point adjustment boundary position, is set as the focus position, and in step S118 the CCD image sensor 6 is moved to position a and stopped, and the automated focus point adjustment is completed.

If, however, the relation $\Delta b > \Delta b$ is obtained in step S117, the contrast distribution is described by the dashed line in FIG. 23a. In this case, the center position c is set as the focus position in a pseudo process because detection is defective at the determined focus position. This arrangement not only avoids wasting additional time, but also prevents ending the automated focus point adjustment with disabled image reading.

Figure 23B:
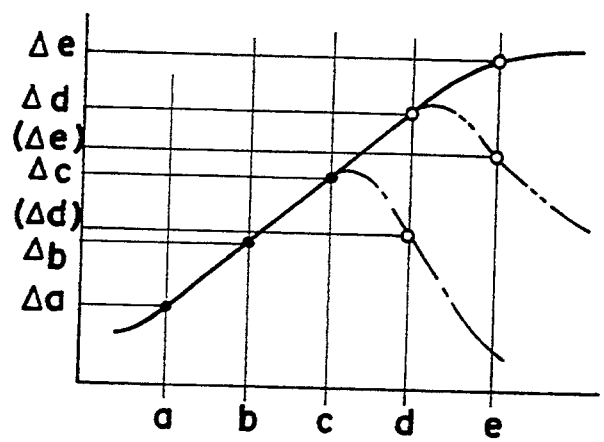

When $\Delta a > \Delta b$ in step S115, $\Delta b > \Delta b$ in step S116, $\Delta c > \Delta d$ in step S123, and $\Delta d > \Delta e$ in step S125, the contrast distribution is described by the solid line in FIG. 23b. In this case the focus point adjustment boundary position, i.e., the extreme image side position e, is set as the focus position. In step S127, the CCD image sensor 6 is moved to position e and stopped, and the automated focus point adjustment is completed.

In the aforesaid process, if the relation $\Delta c > \Delta d$ is not obtained in step S119, the contrast distribution is described by the dashed line in FIG. 23b. The center position c is set as the focus position, and in step S121 the CCD image sensor 6 is moved to position c and stopped, and the automated focus point adjustment is completed.

When the relation $\Delta d > \Delta e$ is not obtained in step S125, the contrast distribution is described by the imaginary line in FIG. 23b. The position d is set as the focus position, and in step S126 the CCD image sensor 6 is moved to position d and stopped, and the automated focus point adjustment is completed.

Figure 23C:
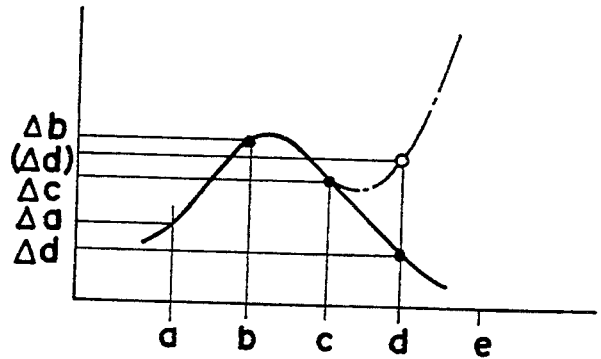

In the aforesaid process, when the relation $\Delta a > \Delta b$ is obtained in step S115, the relation $\Delta b > \Delta b$ is not obtained in step S116, and the relation $\Delta c > \Delta d$ is not obtained in step S119, the contrast distribution is described by the solid line in FIG. 23c. Position b is set as the focus position, and in step S122 the CCD image sensor 6 is moved to position b and stopped, and the automated focus point adjustment is completed.

If the relation $\Delta c > \Delta d$ is obtained in step S119, the contrast distribution is described by the dashed line in FIG. 23c. Position c is set as the focus position, and in step S121 the CCD image sensor 6 is moved to position c and stopped, and the automated focus point adjustment is completed.

The automated focus point control device of the seventh embodiment is described hereinafter.

Figure 24:
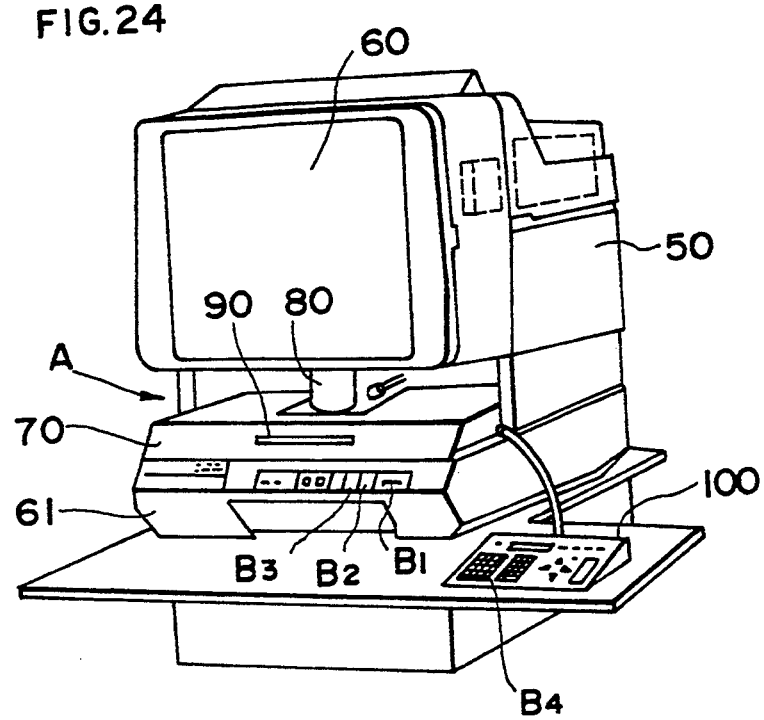
FIG. 24 is a perspective view of a microfilm image reader using the seventh embodiment of the automated focus point control device of the present invention.

FIG. 24 is a perspective view of a microfilm reader using the automated focus point control device of the seventh embodiment. This microfilm reader is provided with a built-in lamp (light source) for illuminating an image in the bottom portion of the body 61, and a printer for printing images projected by said lamp. The front surface of the bottom portion of the body 61 is provided with an arrangement of predetermined operation buttons including a print button B1, zoom button B2, autofocus button B3 and the like.

An optical system is provided within the top portion 50 of the body, and a screen 60 onto which is projected the film image is provided at the front of the top portion 50 of the body. Beneath the aforesaid screen 60 is provided a film carrier loading slot A, and into said slot A is loaded a microfiche film carrier 70 which has a frame searching function. The microfiche carrier 70 is constructed so as to be completely replaceable and can be removably pulled from the front of the body. A microfiche film insertion slot 90 is formed in the front surface of the microfiche carrier 70. A roll film carrier may alternatively be loaded in the aforesaid slot A in place of the microfiche film carrier 70.

A projection lens 80 for forming and projecting a part of a projection optical path is provided in the center of the top surface of the microfiche carrier 70 loaded in the body. A controller 100 is connected to the microfiche film carrier 70 via a connecting cord. The controller 100 searches the film frames in accordance with a frame number input from the frame feed key B4 or the like.

Figure 25:
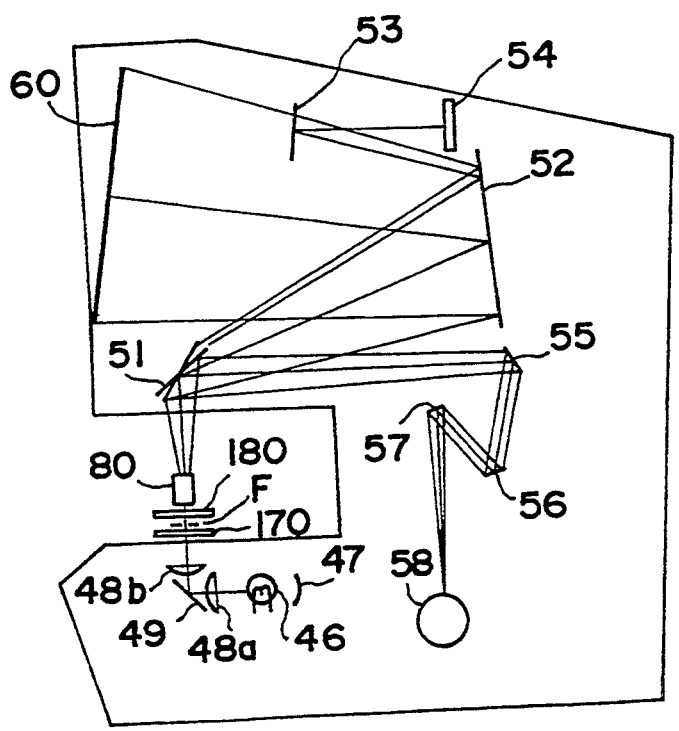
FIG. 25 is a perspective view of a microfilm image reader using the seventh embodiment of the automated focus point control device of the present invention.

FIG. 25 is an illustration showing the projection optical system within the microfilm reader. In the drawing, reference numeral 48 refers to a lamp, reference numeral 47 refers to a concave mirror, reference numerals 48a and 48b refer to condenser lenses, and reference numeral 49 refers to an illumination mirror. The film holders 170 and 180 are disposed within the microfiche film carrier 70 (not illustrated). These film holders 170 and 180 maintain the film F therebetween. Light emitted from the lamp 48 passes through the condenser lens 48b and illuminates the film F maintained between the film holders 170 and 180. The light passing through the film F passes through the projection lens 80 and impinges the mirror 51.

The mirror 51 is constructed so as to be rotatable upon a center axis, such that one of two optical paths are selectable through the angle of said rotation. The first optical path causes the projected light reflected by the mirror 52 to be projected on the screen 60. The second optical path causes the light reflected by the mirror 51 to be projected onto the photosensitive drum 58 via the mirrors 55≈57. When the second optical path has been selected, the image is projected onto the surface of the photosensitive drum 58, and said image is printed on a copy sheet (not illustrated).

In the first optical path, a half-mirror 53 is disposed between the mirror 52 and the screen 60. A CCD 54 of the line sensor type is provided at a position opposite a half-mirror 52. Accordingly, a part of the light passing through the first optical path is reflected by the half-mirror 53, and thereafter impinges the CCD 54. The CCD 54 of the line sensor type converts the received light into signals expressing one-dimensional coordinates. That is, the CCD 54 sequentially outputs voltages in proportion to the light received by each phototransistor arrayed linearly on the top of the CCD 54.

Figure 26:
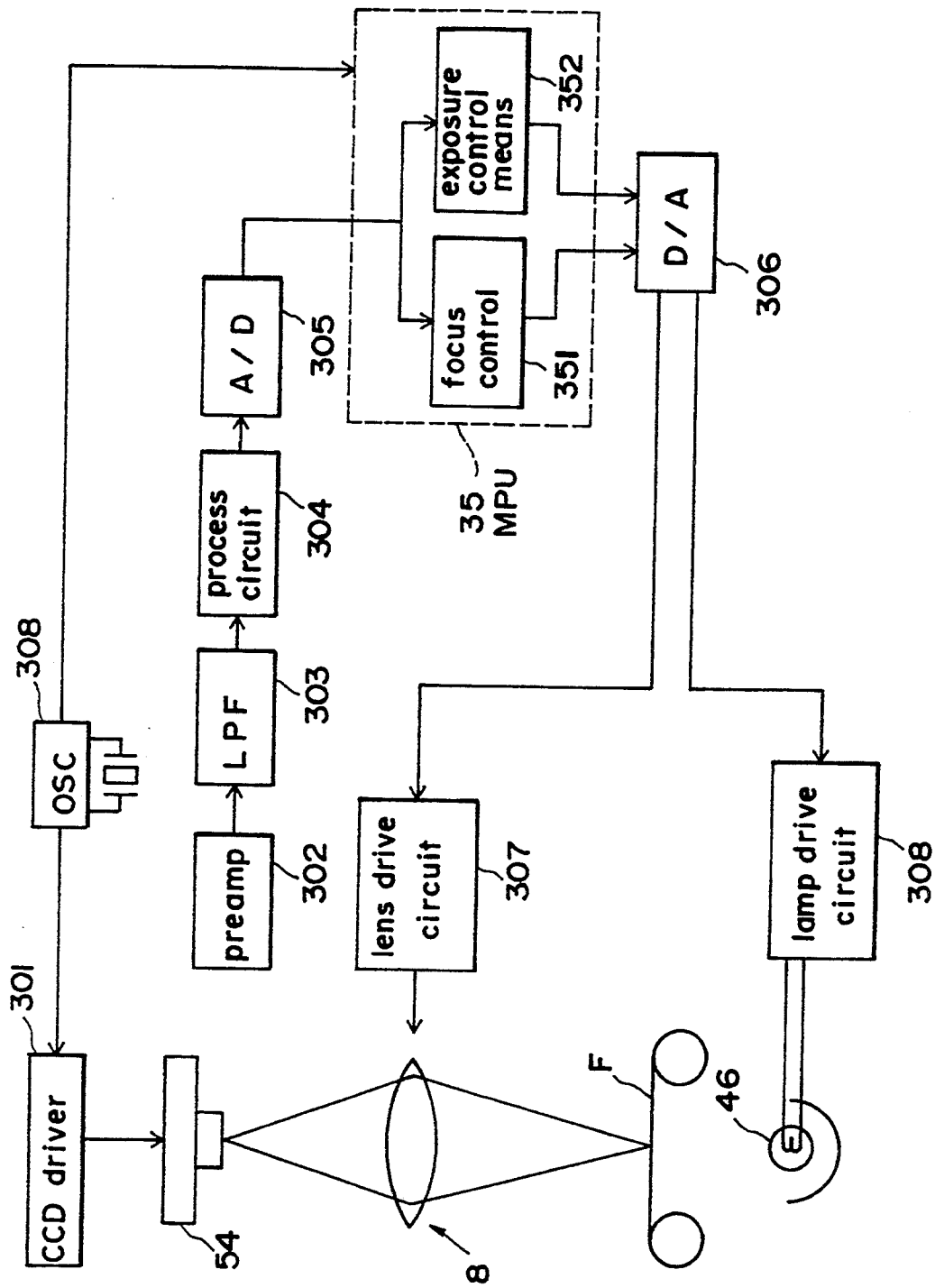
FIG. 26 is a block diagram of the automated focus point control device of the seventh embodiment.

FIG. 26 is a block diagram showing the automated focus point control device of the seventh embodiment. In the drawing, the light emitted from the lamp 46 passes through tile film F, projection lens 80 and the like, and thereafter impinges the CCD 54. The CCD 54 is driven by a CCD driver 301. The CCD driver 301 receives clock pulses of s predetermined frequency output from an oscillation circuit (OSC) 308. The signals output from the CCD 54 are amplified by the pre-amp 302, and thereafter used in a sample hold process. The low-pass filter (LPF) 303 eliminates the clock segments contained in the signals output from the CCD 54.

The processing circuit 304 includes a clamp circuit for preventing variation in the black level and the like. The signals output from the processing circuit 304 are converted to digital signals by the A/D converter 305, and thereafter are input to the MPU 35. The microprocessing unit (MPU) 35 comprises ROM, RAM, CTC and the like as well as a CPU. The MPU 35 is provided with a focus control means 351 and an exposure control means 352. The focus control means 351 computes the amount of position adjustment of the projection lens 80 so as to focus the projected image in the CCD 54 based on the signals output from the CCD 54. The exposure control means 352 controls the amount of exposure light emitted by the lamp 46 based on the signals output from the CCD 54.

The D/A converter 306 converts the digital signals (focus control means 351 and exposure control means 352 outputs) output from the MPU 35 into analog signals. The D/A converter 306 is provided with a multiplexer, so as to be capable of outputting different analog signals to the lens drive circuit 307 and the lamp drive circuit 308, respectively. The lens drive circuit 307 comprises a motor and the like, and accomplishes focus point adjustment by moving the position of the projection lens 80 based on the input signals. The lamp drive circuit 308 comprises an inverter circuit and the like, and controls the power applied to the lamp 46 based on the input signals.

Figure 27:
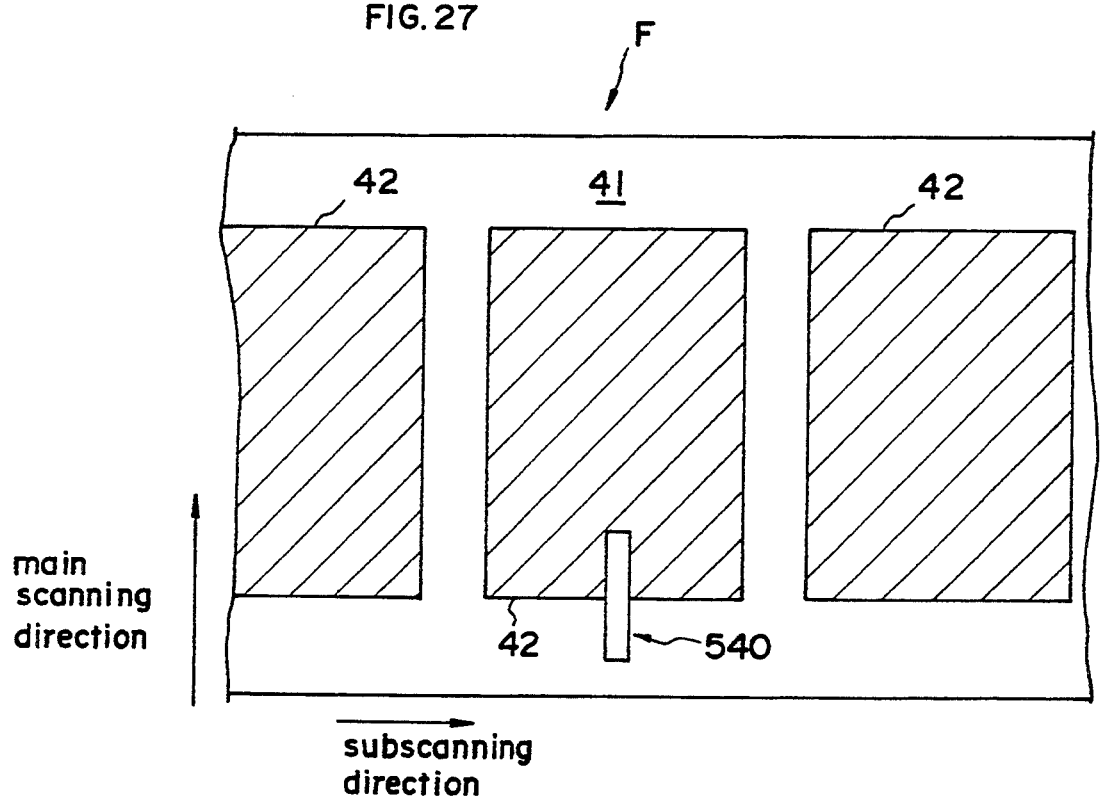
FIG. 27 is an illustration showing the positional relationship of the film and the CCD detecting area in the seventh embodiment of the present invention.

FIG. 27 is an illustration showing the positional relationship between the film F (negative film) and the area 540 detected by the CCD 54. In the following description, a roll type film F is used. The roll type film F has a ribbon-like shape, comprising 42 frames (image areas) arranged in the lengthwise direction (subscan direction). The film F is a negative film, such that the part within the 42 frame areas for recording printed material is white (transparent), whereas the blank part without printing is black. The majority of the area within the 42 frames is black since the majority of the printing area is blank. Margin 41 is transparent because images are not recorded in the margin 41 outside the frame 42 of the film F. Thus, the density in the boundary portion (edge portion) of the frame 42 and the margin 41 changes sharply from white to black. In the drawing, the detection area 540 is the detection area of the CCD 54. In the present invention, focussing is accomplished by detecting via the CCD 54 the difference in density (contrast) of said detection areas 540.

Figure 28:
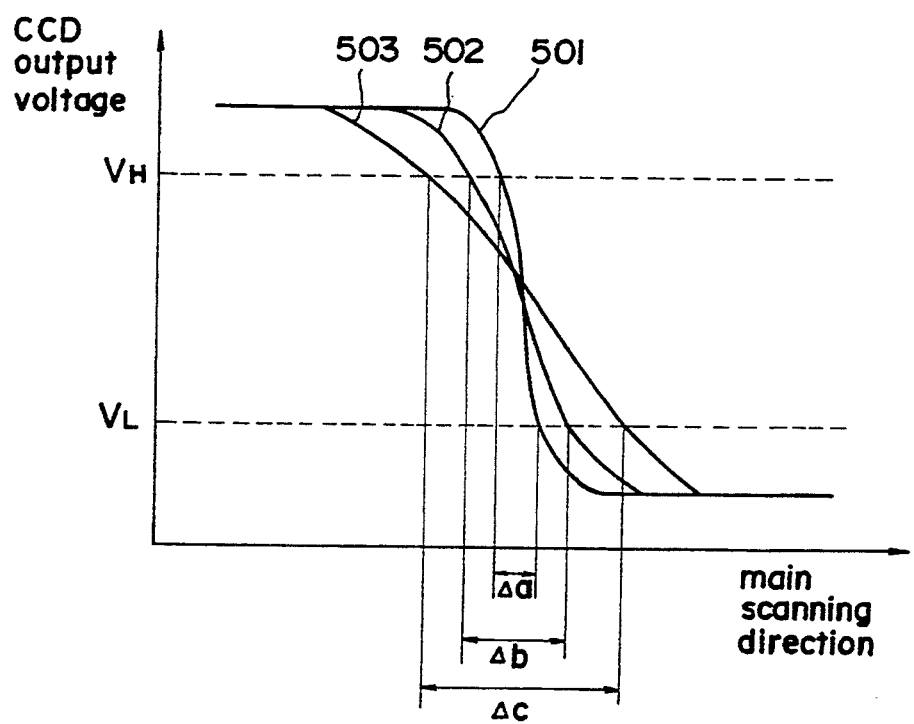
FIG. 28 is a graph showing the CCD output voltage of the seventh embodiment of the present invention.

FIG. 28 is a graph showing the output voltage of the CCD 54. In this graph, the abscissa expresses the coordinate (position in the main scan direction) of each image element on the CCD 54, and the ordinate expresses the output voltage of the image element of the CCD 54. That is, this graph shows the distribution of luminance of the film F in the detection area 540.

Since the margin 41 of the film F is transparent, a great deal of light is transmitted through the margin 41. On the other hand, the amount of light transmitted through the frame 42 is slight because the majority of the frame 42 is black. Thus, the density of the edge portion of the frame 42 varies greatly. When the focus point of the image projected on the CCD 54 is shifted, the output voltage of the CCD 54 has the characteristics shown by the curve 503 in the drawing because the contrast is reduced at the edge portion. The output voltage of the CCD 54 changes from the curve 502 to that of the curve 501 in the drawing, to increase the contrast of the edge portion in accordance with the alignment of the focus point of the image projected on the CCD 54.

The two threshold voltages VL and VH are set to correspond with the voltage output by the CCD 54. In the curves 501, 502 and 503, the distances $\Delta a$, $\Delta b$ and $\Delta c$ in the main scan direction correspond to the threshold voltages VL and VH. Accordingly, the distances become smaller in the order $\Delta c$, $\Delta b$, $\Delta a$ in accordance with the alignment of the focus point of the image projected on the CCD 54.

The operation of the automated focus point control device of the seventh embodiment is described hereinafter. First, the exposure is adjusted to assure the maximum exposure value of the image projected on the CCD 54 is the optimum value. The exposure adjustment is executed for the reasons described below. The CCD 54 typically outputs a voltage proportional to the amount of light received with a gamma value of [1], but the gamma value is reduced by blooming and the like due to light in excess of a certain amount. Thus, as shown in FIG. 29, the maximum value of the output voltage of the CCD 54 virtually does not increase even if the amount of light increases (curve 81). Precise focus determination is difficult due to the reduced contrast of the edge portion of the frame 42. Therefore, the maximum value of light on the CCD 54 is adjusted (exposure light adjustment) so as to output a voltage proportional to the amount of light received by the CCD 54.

In the exposure adjustment, the exposure control means 352 calculates the optimum amount of exposure light and outputs the result to the D/A converter 306 so as to render the maximum voltage value output from the CCD 54 to less than a predetermined value, as shown in FIG. 26. The signals output from the D/A converter 307 are input to the lamp drive circuit 308. The lamp drive circuit 308 causes the lamp 46 to emit an optimum amount of light by controlling the power applied to the lamp 46 in accordance with the aforesaid signals. Thus, the maximum light value of the image projected on the CCD 54 is a predetermined value.

Next, the focus point adjustment is executed in the sequence described hereinafter. The signals output from the CCD 54 are fed through the preamp 302 and LPF 303 and the like, and thereafter converted into digital signals by the A/D converter 305, after which said digital signals are input to the MPU 35. In the MPU 35, the focus control means 351 samples the input signals periodically in predetermined intervals, and generates data in the same manner as the image sensor of the first through sixth embodiments, as shown in FIG. 8. The focus control means 351 counts the number of data between the threshold voltages VL and VH among the sample data, as shown in FIG. 9.

The data between the threshold voltages VL and VH express the edge portion of the frame 42 of the film F. When the focus point of the image on the CCD 54 is aligned, the contrast of the edge portion becomes greater. In this case, the number of data within the range of the threshold voltages VL and VH is reduced due to the steep slope of the graph shown in FIG. 28. On the other hand, when the focus point of the image projected on the CCD 54 is shifted, the number of data within the range of the threshold voltages VL and VH is increased. Accordingly, focus determination can be accomplished by counting the number of data in the range between the threshold voltages VL and VH. That is, when the number of data in the range between threshold values VL and VH is a minimum, the projected image is determined to be in a focussed state.

The focus control means 351 calculates the amount of movement of the projection lens 80 so as to maintain the number of data within the range of the threshold voltages VL and VH below a predetermined number. The digital data obtained from the aforesaid calculations are converted into analog signals by the D/A converter 306, and input to the lens drive circuit 307. The lens drive circuit 307 moves the projection lens 80 a predetermined amount only in accordance with the aforesaid input signals. Thus, the image projected on the CD 54 is focussed, and at the same time the image projected on the screen 60 is also focussed.

As previously described, the automated focus point control device of the seventh embodiment can focus the image projected on the screen 60 by detecting the contrast at the edge portion of the frame 42 of the film F. In the film F, the edge portion of the frame 42 need not be searched because the size and position of the frame 42 is predetermined. It is clear, therefore, that the focussing operation can be accomplished in a short time.

The detection area of the edge portion of the frame 42 is not impeded even when a plurality of such areas are provided, as shown in FIG. Therefore, a focussing operation of higher precision can be accomplished by detecting the contrast at a plurality of locations and using the mean value of said contrasts. Furthermore, it is possible to prevent only a part of the image projected on the screen 60 from being excessively shifted.

Furthermore, the CCD 54 may be arranged behind the screen 60 without using the half-mirror 53 and without hindering the focussing operation. In such a case, the CCD 54 is prevented from obstructing the image projected on the screen 60 during normal use by moving the CCD 54 behind the screen 60 only during the focussing operation. In the present embodiment, the half-mirror 53 may be moved into the optical path without causing obstruction only during the focussing operation.

In the automated focus point control device of the seventh embodiment, the contrast of the edge portion of the frame 42 is detected while the position of the projection lens 80 is moved. It is, however, to be noted that the contrast of the edge portion may be detected while the CCD 54 is moved in the direction of the optical axis. Thus, the image on the screen 60 can be focussed based on the position of the CCD 54 when the contrast of the edge portion projected on said CCD 54 is a maximum.

It is further to be understood that in the focus control means 35 the high limit component of the edge portion may be calculated using an FFT process or the like, instead of calculating the contrast of the edge portion. When the high limit component is at a maximum, the image projected on the CCD 54 is determined to be focussed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An automated focus point control device comprising:
   a projection optical unit for projecting light transmitted through a film to a predetermined position, said film having a frame portion and a margin portion;
   a detector for detecting light transmitted through at least one boundary portion of said frame portion and said margin portion in the film and outputting detection signals; and
   a controller for aligning the focus point of an image projected onto the predetermined position by adjusting said projection optical unit based on the detection signals of the detector so as to maximize the contrast of the transmitted light of the boundary portion.

2. An automated focus point control device as claimed in claim 1 wherein said a detector detects the amount of the light transmitted through said boundary portion of the frame portion and the margin portion and outputs the detection signal.

3. An automated focus point control device comprising:
   a projection optical unit for projecting light transmitted through a film to a predetermined position, said film having a frame portion and a margin portion;
   a detector for detecting light transmitted through at least one boundary portion of said frame portion and said margin portion in the film and outputting detection signals; and
   a controller for aligning the focus point of an image projected onto the predetermined position by adjusting said detecting means based on the detection signals of the detector so as to maximize the contrast of the transmitted light of the boundary portion.

4. An automated focus point control device as claimed in claim 3 wherein said a detector detects the amount of the light transmitted through said boundary portion of the frame portion and the margin portion and outputs the detection signal.

5. An automated focus point control device comprising:
   projecting means for projecting an object image to a predetermined position;
   detecting means for detecting the contrast of a projected image on said predetermined position and outputting the contrast;
   moving means for moving said detecting means so as to output the contrast at a plurality of points including the center position, extreme object side position and extreme image side position within adjusting range of said projecting means;
   control means for controlling said moving means so as to further move a detector from the center position toward the position on the side having less difference in contrast with the center position after checking which of the extreme object side position and the extreme image side position has less difference in contrast with the center position;
   determining means for determining the infocus condition when the contrast output from the detecting means which is moved toward the position on the side having less difference in contrast with the center position is greatest.

6. An automated focus point control device comprising:
   a projector for projecting an image to a predetermined position;
   a detector for detecting the contrast of a projected image on said predetermined position and outputting a signal representative of the contrast;
   a driving system for moving said detector so as to output a contrast signal at a plurality of points including the center position, extreme object side position and extreme image side position within an adjusting range of said detector;
   checking means for checking the differences in contrast signals between the center position and the extreme object side position and between the center position and the extreme image side position within the adjusting range of said detector; and
   determining means for determining the center position as the focus position when the gap of differences in contrast between the center position and the extreme object side position and between the center position and the extreme image side position is checked to be within a predetermined range.

7. An automated focus point control device comprising:
   a projector for projecting an object image to a predetermined position;
   a detector for detecting the contrast of a projected image on said predetermined position and outputting the contrast;
   a driving system for moving said detector so as to output the contrast at a plurality of points including lateral positions at both sides of the center position of an adjusting range of said detector;
   a calculator for calculating the difference in contrast between the lateral positions at both sides of the center position;
   first determining means for determining an in-focus condition when the difference in contrast is within a predetermined range, and determining an out-of-focus condition when the difference in contrast is out of said predetermined range;
   a controller for controlling said driving system so as to further move the detector toward a higher contrast position after checking the contrast between the lateral positions when the out-of-focus condition is determined; and
   second determining means for determining the in-focus condition when the contrast output from the detector which is moved toward the higher contrast position is at its greatest value.

8. An automated focus point control device comprising:
   a projector for projecting an object image to a predetermined position;
   a detector for detecting the contrast or a projected image on said predetermined position and outputting the contrast;
   a driving system for moving said detector so as to output the contrast at a plurality of points including specific positions within an adjusting range of said detector;
   determining means for determining an in-focus condition based on the difference in contrast at said plurality of positions; and
   a controller for controlling said determining means so as to determine the center position as a focus position in a pseudo process when there is no focussing condition.

9. A method performed in an automated focus point control device for aligning the focus point of an image projected from an image of a film onto a projected surface, said method comprising the steps of:
   projecting light transmitted on the projection surface through the film having a frame portion and a margin portion by means of a projection optical unit;
   detecting light transmitted through at least one boundary portion of said frame portion and said margin portion in the film and outputting detection signals by means of sensor; and
   adjusting either of said projection optical unit or said sensor based on the detection signals so as to maximize the contrast of the transmitted light of said boundary portion.

* * * * *